United States Patent
Singh

(10) Patent No.: US 12,105,670 B1
(45) Date of Patent: Oct. 1, 2024

(54) PERFORMING SNAPSHOTTING OPERATIONS USING DATA STRUCTURES STORING WEAK REFERENCES

(71) Applicant: MICROSOFT TECHNOLOGY LICENSING, LLC, Redmond, WA (US)

(72) Inventor: Neeraj Kumar Singh, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/344,633

(22) Filed: Jun. 29, 2023

(51) Int. Cl.
*G06F 16/11* (2019.01)
*G06F 16/22* (2019.01)

(52) U.S. Cl.
CPC .......... *G06F 16/128* (2019.01); *G06F 16/125* (2019.01); *G06F 16/2246* (2019.01)

(58) Field of Classification Search
CPC ..... G06F 16/16; G06F 16/128; G06F 16/2365
USPC ....................................... 707/639
See application file for complete search history.

(56) References Cited

U.S. PATENT DOCUMENTS

| | | | |
|---|---|---|---|
| 11,216,416 B2 | 1/2022 | Carey et al. | |
| 11,841,826 B2* | 12/2023 | Patil | G06F 3/0671 |
| 2012/0130949 A1* | 5/2012 | Picken | G06F 16/128 707/626 |
| 2022/0188267 A1* | 6/2022 | Patil | G06F 16/185 |
| 2023/0028391 A1* | 1/2023 | Patil | G06F 16/1727 |

\* cited by examiner

*Primary Examiner* — Hung T Vy
(74) *Attorney, Agent, or Firm* — Newport IP, LLC; Jacob P. Rohwer

(57) ABSTRACT

A processing system manages an ordered set of hierarchical data structures representing snapshots that define the state of a filesystem at different points in time. The data structures include nodes that store strong references, which can be utilized to read or write data, or weak references that can be only utilized to read data. In order to create a new snapshot, a root node is created for a new data structure representing the new snapshot by copying the root node of the data structure representing an active view of the filesystem. Any strong references stored in the copy of the root node are then changed to weak references. Snapshotting operations can then be performed with respect to the new snapshot utilizing the weak references stored in the root node of the new data structure.

20 Claims, 19 Drawing Sheets

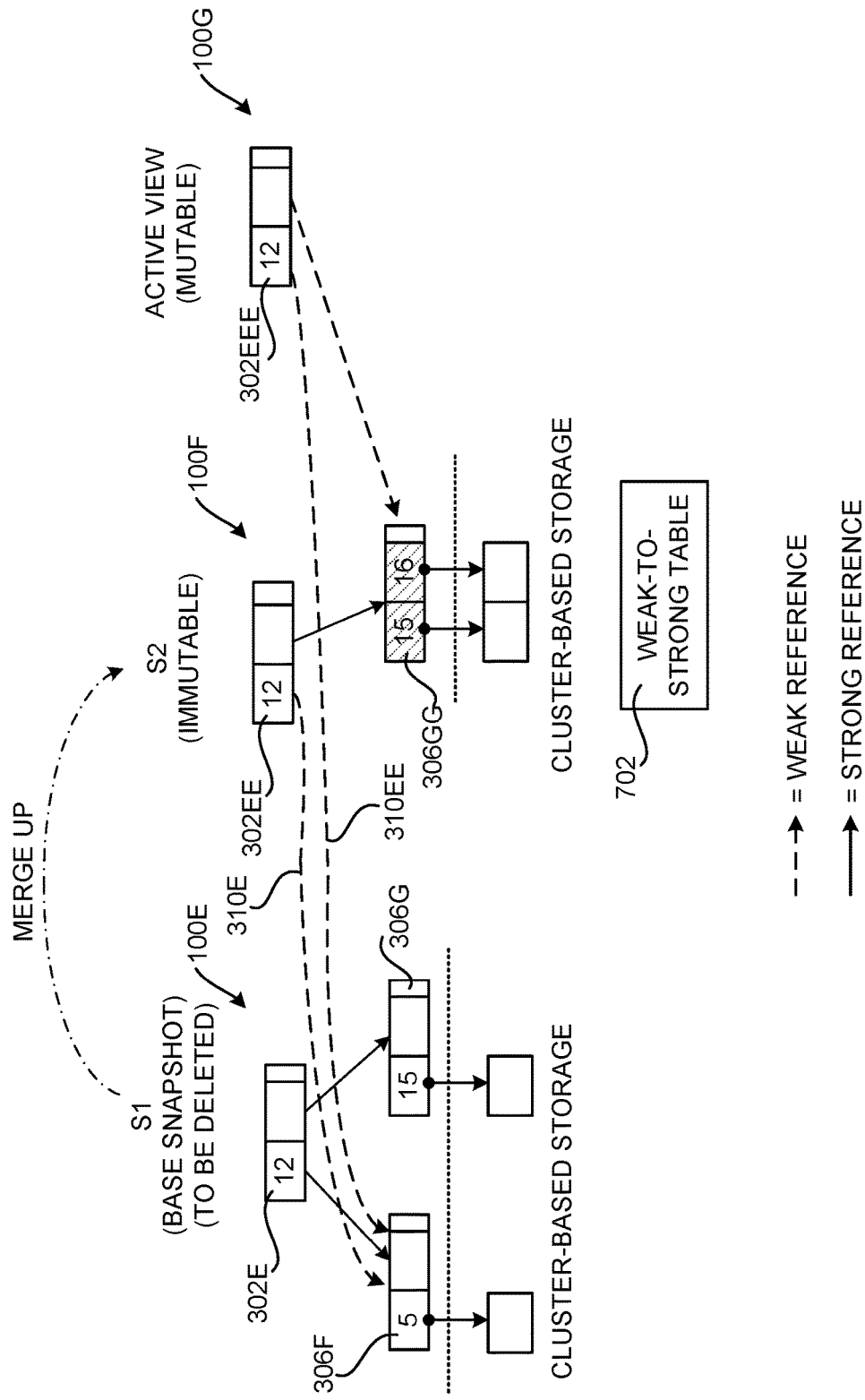

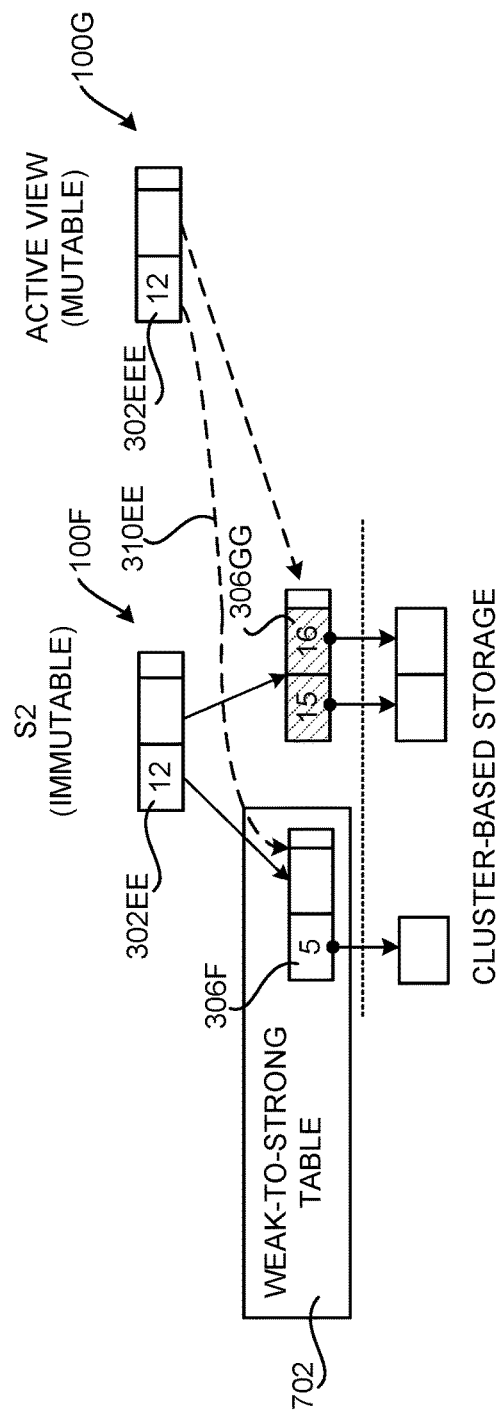

PERFORMING SNAPSHOTTING OPERATIONS USING DATA STRUCTURES STORING WEAK REFERENCES

BACKGROUND

Many types of processing systems support snapshotting functionality that enable data, such as files, filesystems, volumes, pools, and database tables, to be rolled back to a prior state or to be read as a historical version. Using this functionality, a read-only snapshot instance can be created that captures a consistent version of the data at a point in time. As the active view, or views, of the data changes over time, the data for a snapshot instance remains readable by explicit request.

Some filesystems implement aspects of snapshotting functionality using hierarchical reference counting of data and metadata. Using hierarchical reference counting and copy-on-write ("COW"), a hierarchical (e.g., tree-shaped) data structure is utilized to organize the data and metadata stored by the filesystem. Additional metadata is also maintained that counts the number of in-use references to a particular portion (e.g., a block or a cluster) of a storage device. So long as the count is non-zero, the associated portion of the storage device is considered to be in use by the filesystem. If the count becomes zero, the portion is no longer considered to be in use by the filesystem and can be freed.

When a snapshot instance is created, a new tree root is created that references any existing data, which requires incrementing the reference count. Further modification of the active view requires hierarchically copying nodes of the tree that lead to the data being modified. Also, unmodified portions of the tree pointed to by copied nodes must have their reference counts incremented, since copying a node creates new incoming references. Hierarchical reference counting in this manner can impose significant processing overhead when updating filesystem metadata.

Some processing systems provide snapshotting functionality without the use of hierarchical reference counting by utilizing hierarchical data structures corresponding to snapshots that store nodes along with strong or weak references. A strong reference in a snapshot instance indicates that referenced data is "owned" by that snapshot instance and that it is inaccessible by reading from an older snapshot. A weak reference in a snapshot instance indicates that the referenced data is also accessible from an older snapshot instance. A weak reference to data in an active view implies that the data cannot be modified in place, since an older snapshot instance is also referencing that data, and that data may be requested at some point in the future.

Current snapshotting implementations that utilize weak and strong references also suffer from technical drawbacks. For example, searching for records using implementations such as these can require progressively searching multiple hierarchical data structures corresponding to multiple point-in-time snapshots, which can be computationally intensive.

SUMMARY

Technologies are disclosed herein for performing snapshotting operations using data structures representing snapshot instances (referred to herein as "snapshots") with weak references to other data structures representing prior snapshots. Through implementations of the disclosed technologies, snapshotting operations can be performed in a manner that does not utilize hierarchical reference counting and that matches or reduces the algorithmic complexity of previous solutions that rely on the use of strong and weak references. In particular, using the disclosed technologies, new filesystem snapshots can be created in O(1) time complexity, filesystem snapshots can be modified in O(log N) time complexity, and adjacent filesystem snapshots can be merged to delete a snapshot in O(size of A) time complexity. Other technical benefits not specifically mentioned herein might also be realized through implementations of the disclosed subject matter.

In order to provide aspects of the functionality disclosed herein, a processing system manages an ordered set of hierarchical data structures corresponding to individual point-in-time snapshots and one or more active views. In an embodiment, the hierarchical data structures are B+ trees. B+ trees are self-balancing hierarchical tree structures having a variable, but often large, number of children per node. B+ trees include nodes storing keys, with leaf nodes including records for key-value mappings corresponding to at least a subset of an assigned key range. The data stored in B+ trees for active views are logically modifiable by a client, while B+ trees for snapshots are logically immutable.

In an embodiment, the B+ trees representing snapshots define the state of a filesystem at a particular point in time. For instance, a B+ tree can define the state of filesystem metadata, such as a streams table that specifies a mapping between virtual cluster numbers ("VCNs") and logical cluster numbers ("LCNs") for a file, at a particular point in time. The B+ trees define snapshots of other types of filesystem metadata in other embodiments.

In an embodiment, the ordered set of B+ trees includes a first B+ tree that defines an active view of a filesystem. The first B+ tree includes a root node that stores strong references to one or more internal nodes. A strong reference indicates that referenced data is owned by that snapshot and that it is inaccessible by reading from an older snapshot.

The processing system can receive a request to create a snapshot of the filesystem. In response to such a request, the processing system marks the first B+ tree as immutable and creates a B+ tree that represents a new active view of the filesystem. The processing system creates a root node for the new B+ tree by copying the root node of the first B+ tree, including any references to other nodes stored in the root node of the first B+ tree.

The processing system also changes any strong references in the root node of the new B+ tree to weak references. A weak reference indicates that the referenced data is also accessible from an older snapshot instance. Consequently, a weak reference cannot be utilized to write data to a referenced node. Moreover, a weak reference to data in an active view implies that the data cannot be modified in place, since an older snapshot instance is also referencing that data, and that data may be requested at some point in the future.

Both strong and weak references can be used to search for data within a given B+ tree. In active views, writes to data referenced by a weak reference are done via a copy, since the data is also referenced by an earlier snapshot version and any in-place overwrite would erase the historical version of the data.

Once the new B+ tree representing the new active view has been created, the processing system marks the new B+ tree as mutable. The processing system can then perform various operations on the new B+ tree without modifying the first B+ tree. For example, the processing system can perform a search operation with respect to the snapshot of the filesystem defined by the first B+ tree by following the weak references stored in the root node of the new B+ tree to the internal nodes and leaf nodes of the first B+ tree.

The processing system can also perform operations for modifying (e.g., creating, updating, and deleting) records in the active view defined by the new B+ tree. For example, the processing system may receive a request to modify a record in the new B+ tree. In response thereto, the processing system traverses the new B+ tree from the top down and, at each layer of the B+ tree where a weak reference is encountered, performs a COW operation to create a copy of a node in the new B+ tree. If the processing system encounters a strong reference during the top-down traversal, the referenced node belongs only to the new B+ tree and no copy is required to preserve historical data. The processing system also turns the weak references into strong references to nodes of the second B+ tree as it copies the nodes. The processing system then performs the requested modification to the appropriate record in a leaf node of the new B+ tree.

In an embodiment, the processing system can also delete a B+ tree representing a snapshot that has weak references to or from nodes in other B+ trees representing other snapshots. For example, the processing system may receive a request to delete a snapshot represented by a B+ tree. A snapshot is deleted by marking the instance as deleted, to prevent further read operations, and then by 'merging' the snapshot instance with the neighboring newer snapshot instance or active view. In particular, the processing system enumerates leaf nodes of the B+ tree corresponding to the snapshot to be deleted.

The processing system also identifies the types of references (e.g., weak or strong) associated with each of the enumerated leaf nodes and corresponding leaf nodes in a B+ tree that is a neighbor to the B+ tree that is to be deleted. The processing system then selects a merger action to be performed (e.g., deleting a leaf node, ignoring a leaf node, or adding a leaf node to a weak-to-strong table) with respect to each leaf node based upon the combination of reference types (e.g., weak/strong, strong/strong, strong/weak, weak/weak).

When the B+ tree corresponding to the snapshot to be deleted and the neighbor B+ tree are both immutable, the processing system identifies leaf nodes in the B+ tree corresponding to the snapshot to be deleted that have an associated strong reference and that have a corresponding leaf node in the neighbor B+ tree having an associated weak reference. The processing system stores data referencing the identified leaf nodes in a separate weak-to-strong table associated with the neighbor B+ tree. The processing system utilizes the data in the weak-to-strong table to determine when the identified leaf nodes, and the data they reference, can be freed in a subsequent snapshot delete operation. The weak-to-strong table is utilized because the corresponding B+ tree nodes are not modifiable in-place and may be referenced by dependent B+ tables.

In an embodiment, the disclosed processing system can create B+ trees representing new snapshots even when nodes in B+ trees for prior snapshots referenced by weak references are dirty. A dirty node is a node stored in memory that does not match the version of the node that has been persisted to mass storage. In systems that do hierarchical data integrity check summing (e.g., Merkle trees) checksums are stored with each reference to a B+ tree node. Checksums are propagated up the tree from leaf nodes toward the root node, since each node's checksums are computed based on checksums stored by nodes lower in the B+ tree. The processing system computes the checksums as part of the process that writes out each B+ tree to persistent storage.

In an embodiment, the processing system identifies any strong references stored in a new root node of a new B+ tree representing a new snapshot that references a dirty node in a B+ tree representing a previous snapshot. The processing system changes each reference to a dirty node in the new root node to a dirty weak reference and propagates checksums from the root node of an older snapshot to a newer one. If multiple dirty snapshots exist checksums must be propagated from the oldest snapshot to the newest. A dirty weak reference indicates that an updated checksum for a referenced node is to be obtained and utilized to compute checksums in a B+ tree prior to persisting the B+ tree to mass storage.

In order to persist a B+ tree having nodes with dirty weak references, the processing system utilizes the dirty weak references to collect updated checksums for the referenced nodes in B+ trees representing prior snapshots. The processing system then utilizes the updated checksums to compute new checksums for nodes in the B+ tree having dirty weak references. Once the checksums have been updated, the processing system persists the B+ tree to mass storage, such as cluster-based storage.

The above-described subject matter is implemented as a computer-controlled apparatus, a computer-implemented method, a processing system, or as an article of manufacture such as a computer readable medium in various embodiments disclosed herein. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7C is a data structure diagram illustrating further aspects of the mechanism shown in FIGS. 7A and 7B for deleting a B+ tree representing a snapshot having weak references to or from nodes in other B+ trees representing other snapshots;

FIG. 7D is a data structure diagram illustrating further aspects of the mechanism shown in FIGS. 7A-7C for deleting a B+ tree representing a snapshot having weak references to or from nodes in other B+ trees representing other snapshots;

DETAILED DESCRIPTION

Figure 1:
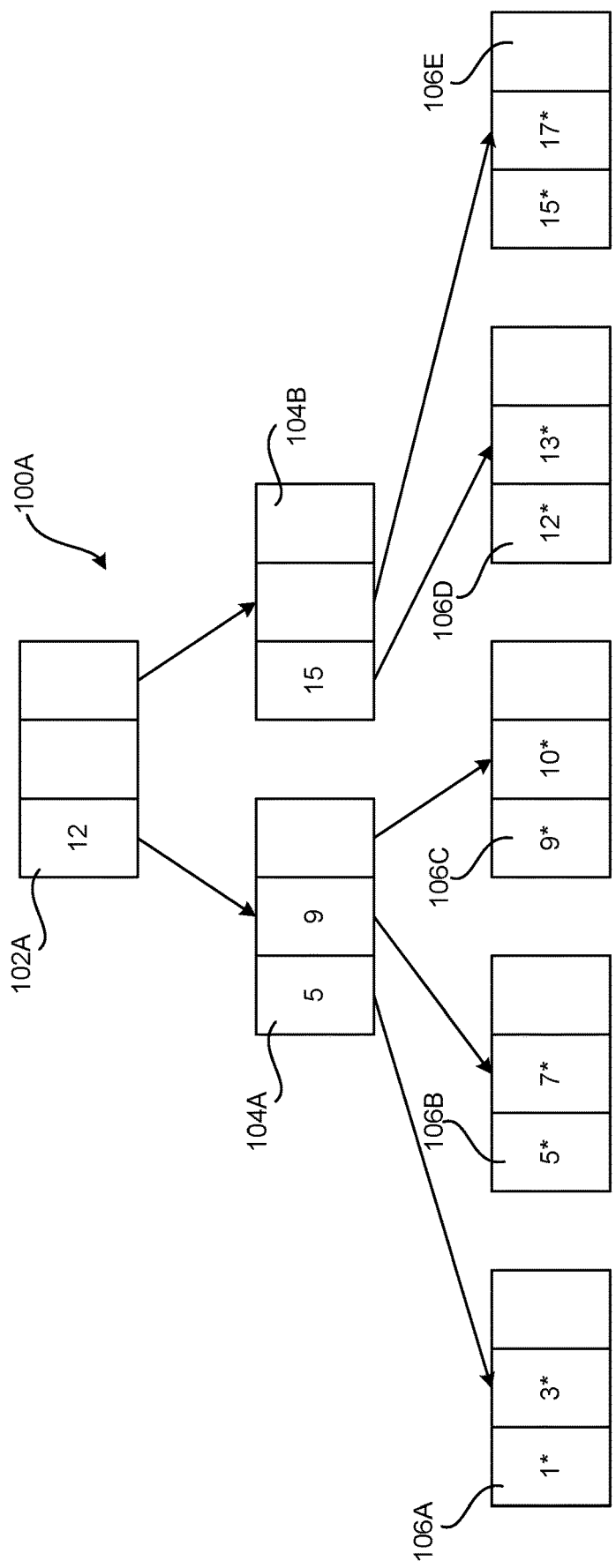
FIG. 1 is a data structure diagram illustrating aspects of an example B+ tree.

The following detailed description is directed to technologies for performing snapshotting operations using hierarchical data structures storing weak references. As discussed briefly above, implementations of the disclosed technologies can perform certain operations on metadata associated with filesystem snapshots in a manner that does not utilize hierarchical reference counting and that matches or improves the algorithmic complexity of previous solutions that rely on the use of strong and weak references. Other technical benefits not specifically mentioned herein might also be realized through implementations of the disclosed subject matter.

As also discussed briefly above, many types of processing systems support snapshotting functionality that enable data, such as files, filesystems, volumes, pools, and database tables, to be rolled back to a prior state or to be read as a historical version. Using this functionality, a read-only snapshot instance can be created that captures a consistent version of the data at a point in time. As the active view of the data changes over time, the data for a snapshot instance remains readable by explicit request.

Some filesystems implement aspects of snapshotting functionality using hierarchical reference counting of data and metadata. Using hierarchical reference counting and COW a hierarchical (e.g., tree-shaped) data structure is utilized to organize the data and metadata stored by the filesystem. Additional metadata is also maintained that counts the number of in-use references to a particular portion (e.g., a block or a cluster) of a storage device. So long as the count is non-zero, the associated portion of the storage device is considered to be in use by the filesystem. If the count becomes zero, the portion is no longer considered to be in use by the filesystem and can be freed.

When a snapshot instance is created, a new tree root is created that references any existing data, which requires incrementing the reference count. Further modification of the active view requires hierarchically copying nodes of the tree that lead to the data being modified. Also, unmodified portions of the tree pointed to by copied nodes must have their reference counts incremented, since copying a node creates new incoming references. Hierarchical reference counting in this manner can impose significant processing overhead when updating filesystem metadata.

Some processing systems provide snapshotting functionality without the use of hierarchical reference counting by utilizing hierarchical data structures corresponding to snapshots that store nodes along with strong or weak references. A strong reference in a snapshot instance indicates that referenced data is "owned" by that snapshot instance and that it is inaccessible by reading from an older snapshot. A weak reference in a snapshot instance indicates that the referenced data is also accessible from an older snapshot instance. A weak reference to data in an active view implies that the data cannot be modified in place, since an older snapshot instance is also referencing that data, and that data may be requested at some point in the future.

Current snapshotting implementations that utilize weak and strong references also suffer from technical drawbacks. For example, searching for records using implementations such as these can require progressively searching multiple hierarchical data structures corresponding to multiple point-in-time snapshots, which can be computationally intensive.

As will be discussed in greater detail below with respect to FIGS. 2-12, technologies are disclosed herein for performing snapshotting operations using hierarchical data structures (e.g., B+ trees) storing weak references. Prior to presenting the technologies disclosed herein, a brief overview of B+ trees will be provided with reference to the illustrative B+ tree 100A shown in FIG. 1. A B+ tree, such as the B+ tree 100A, is a self-balancing hierarchical tree structure with a variable, but often large, number of children per node. A B+ tree includes a root node and might also include additional internal nodes and leaf nodes.

In general, B+ trees represent a range of keys, with leaf nodes including records for key-value mappings corresponding to at least a subset of an assigned range. The root node of a B+ tree represents the entire range of keys covered by the tree. Internal nodes in a B+ tree, if any, represent sub-intervals of the range of keys covered by the B+ tree. Each leaf node in a B+ tree stores zero or more records in the form of key-value pairs.

B+ trees generally have a branching factor b, which is defined as the maximum number of child nodes to which any internal nodes are permitted to point. In some implementations of B+ trees, internal nodes are constrained to have a number of children m, that is defined as [b/2]<=m<=b, and the root node is constrained to have a number of children that is defined as 2<=m<=b.

Leaf nodes in a B+ tree have no children, but in some implementations are constrained to store a number of keys k and their associated values that is defined as [b/2]<=k<=b. For example, in an embodiment disclosed herein, the leaf nodes of a B+ tree such as that shown in FIG. 1 are utilized to store values that map ranges of VCNs to ranges of LCNs for files stored within cluster-based storage. The leaf nodes can be utilized to store other types of filesystem metadata in other embodiments.

In some implementations, the root node of a B+ tree represents one or more key-value pairs if it has no children. In this case, the root node is constrained to represent a number of keys k that is defined as 1>=k<=b-1.

To illustrate, the example B+ tree 100A shown in FIG. 1 includes key-value mappings for keys numbered 1, 3, 5, 7, 9, 10, 12, 13, 15, and 17. The B+ tree 100A includes a root node 102A that represents the entire key range (e.g., 0-∞), divided into subintervals 0-11 and 12-∞. The internal node 104A represents the subinterval of keys 0-11, divided further into subintervals 0-4, 5-8, and 9-11. The internal node 104B represents the subinterval of keys 12-∞, divided further into subintervals 12-14 and 15-00.

The leaf node 106A corresponds to subinterval 0-4 and stores key-value mappings for keys 1 and 3, the leaf node 106B corresponds to subinterval 5-8 and stores key-value mappings for keys 5 and 7, the leaf node 106C corresponds to subinterval 9-11 and stores key-value mappings for keys 9 and 10, the leaf node 106D corresponds to subinterval 12-14 and stores key-value mappings for keys 12 and 13, and the leaf node 106E corresponds to subinterval 15-0 and stores key-value mappings for keys 15 and 17. The asterisks shown in leaf nodes 106A-106E in FIG. 1 indicate that each key is associated with a value in these leaf nodes.

In order to locate a given key-value mapping within the B+ tree 100A, a search is made for a requested key progressively down the B+ tree 100A, starting at the root node 102A and following the keys specified by the internal nodes 104 in order to locate a leaf node 106 corresponding to an appropriate subinterval. For example, searching for key 5 at root node 102A leads to internal node 104A (e.g., corresponding to subinterval 0-11), and searching for key 5 at internal node 104A leads to leaf node 106B (e.g., corresponding to subinterval 5-8). Here, key 5 and its associated value are found in leaf node 106B.

In another example, searching for key 14 beginning at the root node 102A leads to internal node 104B (e.g., corresponding to subinterval 12-0), and searching for key 14 at internal node 104B leads to leaf node 106D (e.g., corresponding to subinterval 12-14). Here, key 14 is not found in the B+ tree 100.

As discussed above, B+ trees, such as the B+ tree 100A shown in FIG. 1, are frequently used to represent data structures (e.g., tables) storing records (e.g., rows) that include one or more key-value pair mappings. B+ trees often have a relatively high branching factor (e.g., on the order of 100's or more) and, as a result, have a relatively high fanout when compared to other types of tree data structures such as binary search trees, which are limited to two children per node.

A tree data structure having a higher fanout has fewer internal nodes and thus requires fewer node traversals to locate a leaf node storing a given key-value mapping than a tree data structure having a lower fanout. This characteristic makes B+ trees highly suitable for, among other things, representing data structures that store mappings into mass storage devices or pools of mass storage and other types of filesystem metadata.

Figure 2:
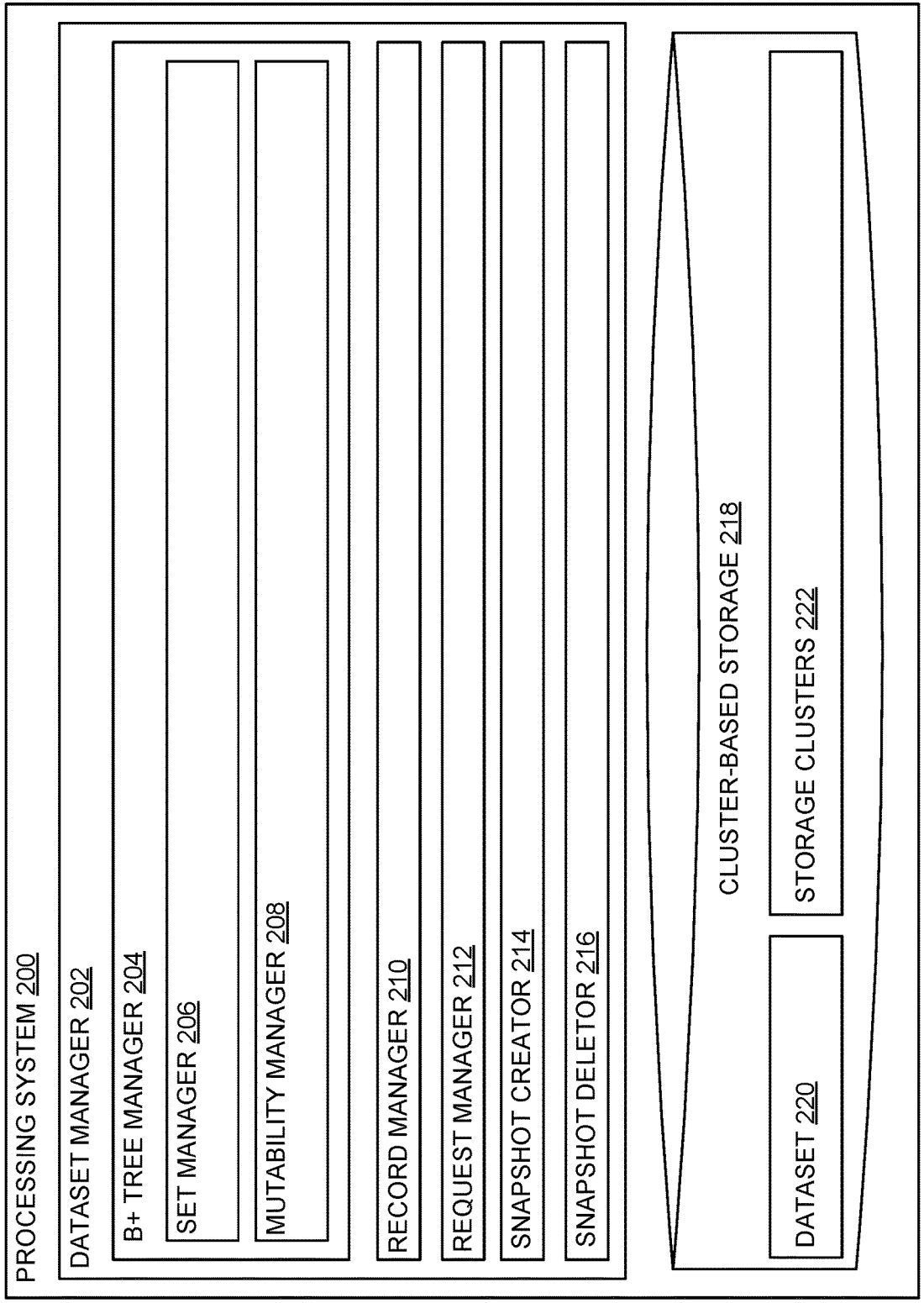
FIG. 2 is a computing architecture diagram showing aspects of an example computer architecture for a processing system that is capable of implementing the functionality disclosed herein.

FIG. 2 is a computing architecture diagram showing aspects of an example computer architecture for a processing system 200 that is capable of implementing the functionality disclosed herein. As illustrated, the processing system 200 includes a dataset manager 202 and cluster-based storage 218 (e.g., a physical or logical storage device). Cluster-based storage 218 includes physical or logical storage clusters 222 that are organized and referenced by a dataset 220. The dataset 220 corresponds to, or includes, filesystem and/or volume metadata that organizes the storage clusters 222 into pools, volumes, datasets, files, and the like.

Although the embodiments disclosed herein reference a processing system 200 that organizes and references storage clusters 222 in cluster-based storage 218, this is for illustrative purposes only. The dataset manager 202 disclosed herein can be utilized with storage systems utilizing other units of storage (e.g., blocks) and can be applied to a broad variety of dataset types and uses beyond files, filesystems, and volumes.

The dataset manager 202 manages the dataset 220, including managing snapshots of the dataset 220. In the illustrated example, the dataset manager 202 includes a variety of sub-components, including a B+ tree manager 204, a record manager 210, a request manager 212, a snapshot creator 214, and a snapshot deletor 216.

The B+ tree manager 204 also includes a set manager 206 and a mutability manager 208, in an embodiment. The set manager 206 manages an ordered set of B+ trees defined by the dataset 220, including snapshots of the B+ trees and an active view of the referenced data. As will be explained in greater detail below, B+ trees within the ordered set of B+ trees are either mutable or immutable. The mutability manager 208 manages data stored in the dataset 220 that indicates whether each B+ tree is mutable or immutable.

As will be described in greater detail below, the B+ trees stored in the dataset 220 include records defining a mapping between a key and a corresponding value or between a range of keys and a corresponding range of values. The record manager 210 manages the storage of these records within leaf nodes of the ordered set of B+ trees managed by the set manager 206.

The request manager 212 manages key-based requests (e.g., queries, write requests, and read requests) using the ordered set of B+ trees (e.g., based on a requested key) stored in the dataset 220 such as, for example, identifying a key-value mapping if there is a record overlapping a requested key.

The snapshot creator 214 and the snapshot deletor 216 manage the creation and deletion of snapshots of the B+ trees stored in the dataset 220, respectively, including creating, merging, and deleting corresponding B+ trees within the ordered set of B+ trees managed by the dataset manager 202. Additional details regarding the operation of these components will be provided below.

It is to be appreciated that the components of the example processing system 200 illustrated in FIG. 2 represent components for implementing the disclosed functionality, according to one embodiment disclosed herein. The depicted components, including their identities, sub-components, and configuration, are presented merely as an aid in describing the functionality disclosed herein. The illustrated components are examples for implementing the disclosed functionality using a processing system 200. Configurations of hardware and software other than that shown in FIG. 2 can be utilized to implement the disclosed functionality according to other embodiments.

Figure 3A:
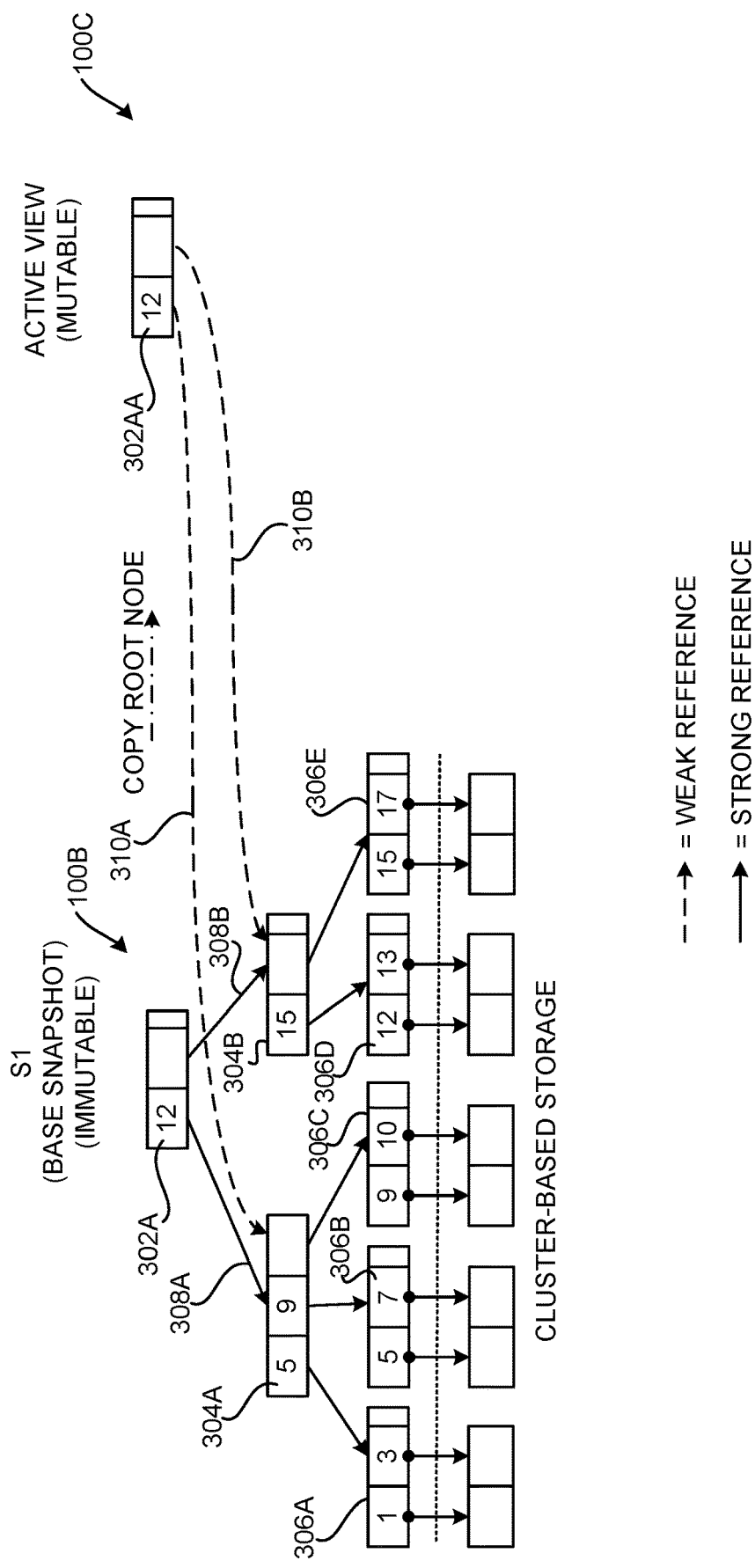
FIG. 3A is a data structure diagram illustrating aspects of a mechanism disclosed herein for creating a B+ tree representing a new active view that includes weak references to a B+ tree representing a prior snapshot.
Figure 3B:
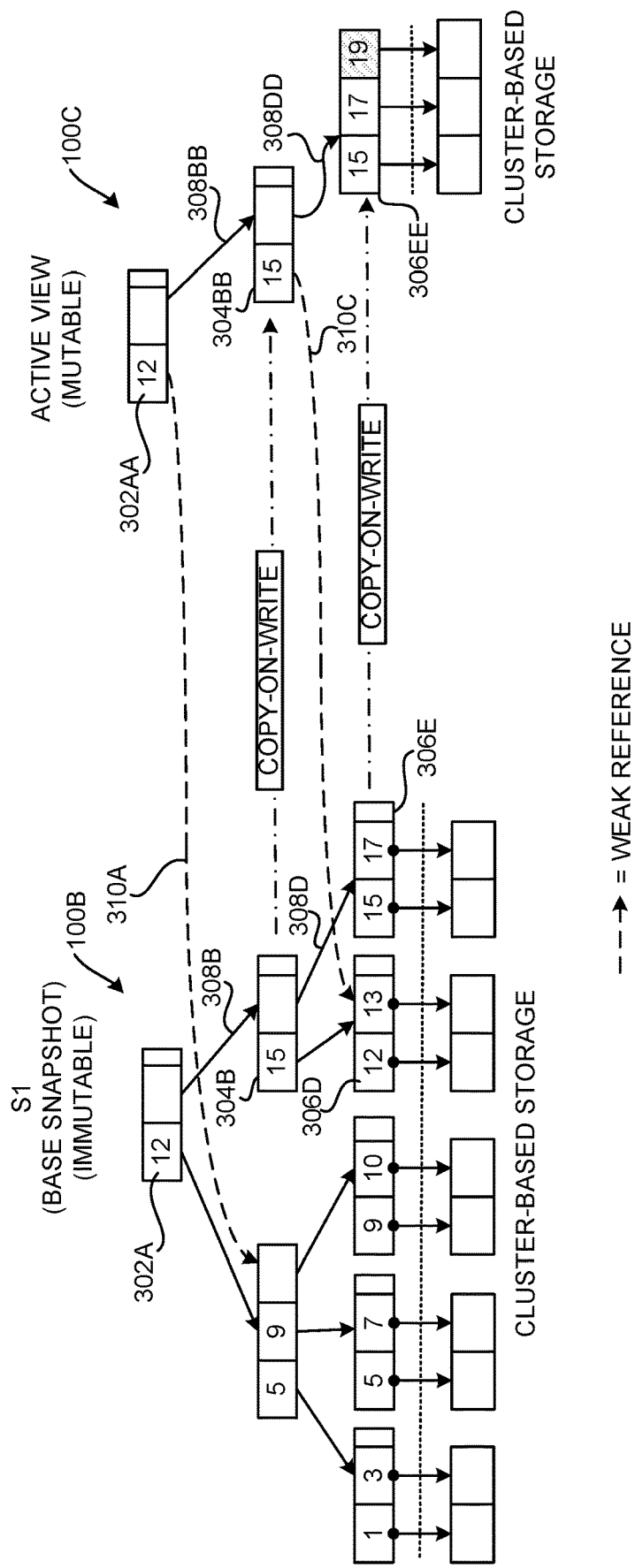
FIG. 3B is a data structure diagram illustrating aspects of a mechanism disclosed herein for modifying a B+ tree representing an active view having weak references to a B+ tree representing a prior snapshot.

FIG. 3A is a data structure diagram illustrating aspects of a mechanism disclosed herein for creating a new B+ tree 100 corresponding to an active of the dataset 220 that includes weak references to B+ trees representing previous snapshots of the dataset. In particular, FIG. 3A shows an example ordered set of B+ trees 100B and 100C that are utilized to represent the dataset 220, including snapshots of the dataset 220. The B+ tree 100B represents a snapshot of the dataset 220 while the B+ tree 100C represents the active view of the dataset 220.

In the example shown in FIG. 3A, the B+ trees 100B and 100C map ranges of VCNs to ranges of LCNs within cluster-based storage 218. The arrows originating from the leaf nodes 306 of the B+ tree 100B to locations on cluster-based storage 218 in FIG. 3A represent these mappings. Thus, in the example shown in FIG. 3A, each of the B+ trees 100B and 100C represents one state of VCN-to-LCN mappings for a file stored within cluster-based storage 218 at a particular point in time.

As discussed above, the leaf nodes 306 of the B+ trees disclosed herein can be utilized to store other types of filesystem metadata in other embodiments. The nodes of the B+ trees can also store additional information, such as a checksum of data stored within each node and its children or checksums of the data referenced by the leaf nodes 306.

In the example shown in FIG. 3A, the B+ tree 100B includes a root node 302A, two internal nodes 304A and 304B, and five leaf nodes 306A-306E. The root node 302A stores strong references 308A and 308B to the internal nodes 304A and 304B, respectively. In particular, the root node 302A stores a strong reference 308A that maps keys 0-11 to the internal node 304A and a strong reference 308B that maps keys 12-∞ to the internal node 304B.

The internal nodes 304A and 304B of the B+ tree 100B also maintain strong references to the leaf nodes 306A-306E, respectively. As discussed briefly above, a strong reference 308 indicates that referenced data is owned by that snapshot and that the referenced data is inaccessible by reading from the B+ tree 100 for an older snapshot. Strong references are identified by solid lines between nodes of the B+ trees 100 shown in the FIGS.

In the example B+ tree 100B, the leaf node 306A stores two records: a first record mapping key 1 to a location (e.g., a block) within cluster-based storage 218 and a second record mapping key 3 to another location within cluster-based storage 218. Leaf node 306B stores records mapping keys 5 and 7 to locations within cluster-based storage 218. Similarly, leaf node 306C stores records mapping keys 9 and 10 to locations within cluster-based storage 218, leaf node 306D stores records mapping keys 12 and 13 to locations within cluster-based storage 218, and the leaf node 306E stores records mapping keys 15 and 17 to locations within cluster-based storage 218. It is to be appreciated that the example B+ trees 100 presented herein have been simplified for discussion purposes and might contain many more nodes and references than shown in the FIGS.

If the B+ tree 100B were the only B+ tree in an ordered set of B+ trees representing the VCN-to-LCN mappings for a file in the cluster-based storage 218, the mutability manager 208 would mark the B+ tree 100B as being mutable. Thus, any modifications to the VCN-to-LCN mappings for the file would be made directly within B+ tree 100B via the addition, removal, or modification of the nodes in the B+ tree 100B. For example, VCN-to-LCN mappings can be added, removed, and deleted via the addition, removal, or modification of records within leaf nodes 306A-306E, the deletion of one or more leaf nodes 306A-306E, and the addition of one or more new leaf nodes 306. The addition or deletion of records stored by the leaf nodes may require changes to the structure of a B+ tree 100, such as the addition or removal of internal nodes and leaf nodes.

In the example shown in FIG. 3A, however, B+ tree 100B is not the only B+ tree in the ordered set. Rather, in this example, the snapshot creator 214 has added an active view through the creation of a new B+ tree 100C. In particular, the mutability manager 208 has marked the B+ tree 100B as immutable and the snapshot creator 214 has created a new B+ tree 100C. Since the B+ tree 100B has been marked as immutable, the data contained therein is now a point-in-time representation, or snapshot, of the VCN-to-LCN mapping state of the corresponding file. It is to be appreciated that while the example shown in FIG. 3A has a single active view represented by the B+ tree 100C, multiple active views may be utilized that represent divergent evolutions of the dataset 220 from a common starting point.

In order to create the new B+ tree 100C, the snapshot creator 214 creates a new root node 302AA by making a copy of the root node 302A of the B+ tree 100B. Additionally, the snapshot creator 214 converts the strong references 308A and 308B to weak references 310A and 310B, respectively, in the new root node 302AA of the B+ tree 100C.

A weak reference 310 to a node in a B+ tree 100 indicates that the referenced data is also accessible from an older snapshot. A weak reference 310 to data in an active view (e.g., the B+ tree 100C) implies that the data cannot be modified in place, since a B+ tree 100 for an older snapshot is also referencing that data, and that data may be requested at some point in the future. Weak references 310 are identified by dashed lines between nodes of B+ trees 100 in the FIGS.

Once the B+ tree 100B has been made immutable and the new root node 302AA in the B+ tree 100C has been created in the manner described above and made mutable, the B+ tree 100C represents the state of the represented file (e.g., the active view) at the time the snapshot was taken. In order to locate a given key-value mapping within the active view defined by the B+ tree 100C, a search is made for a requested key progressively down the B+ tree 100C, starting at the root node 302AA and following strong references 308 and weak references 310 specified by the nodes of the B+ tree 100C and the B+ tree 100B in order to locate a leaf node 306 corresponding to the proper subinterval.

In order to locate a leaf node 306 with a key-value mapping corresponding to key 3 in the active view, for example, the weak reference 310A is followed from the root node 302AA to the internal node 304A in the B+ tree 100B.

The search then progresses within the B+ tree 100B from the internal node 304A to the leaf node 306A.

Similarly, in order to locate a leaf node 306 with a key-value mapping corresponding to key 15 in the active view, the weak reference 310B is followed from the root node 302AA of the B+ tree 100C to the internal node 304B in the B+ tree 100B. The search then progresses within the B+ tree 100B from the internal node 304B to the leaf node 306E.

In order to locate a given key-value mapping within the snapshot defined by the B+ tree 100B, a search is made for a requested key progressively down the B+ tree 100B, starting at the root node 302A (or another node) and following the keys and strong references 308 specified by the nodes of the B+ tree 100B in order to locate a leaf node 106 corresponding to an appropriate subinterval.

When modifications are made to the active view, changes are made to the B+ tree 100C, rather than the B+ tree 100B, which is immutable. In the example illustrated in FIG. 3B, for instance, a new record corresponding to key 19 is to be added to the active view. In order to add the new record, the record manager 210 traverses the B+ tree 100C from the top and performs a COW operation to create copies of nodes 304 in the B+ tree 100B and adds the new nodes to the B+ tree 100C. For instance, in the illustrated example, the record manager 210 has performed a COW operation to create a copy of the internal node 304B, referred to herein as the internal node 304BB.

Once the internal node 304BB has been created, the record manager 210 changes the weak reference 310B from the root node 302AA to the internal node 304B to a strong reference 308BB to the new internal node 304BB. The record manager 210 also adjusts the references contained in the internal node 304BB. In the illustrated example, for instance, the record manager 210 changes the strong reference from the internal node 304BB to the node 306D for the key range 0-14 to a weak reference 310C.

Continuing down the B+ tree 100C, the record manager 210 performs a COW operation to create a new leaf node 306EE in the B+ tree 100C from the leaf node 306E in the B+ tree 100B. The record manager 210 then adds the new record corresponding to key 19 to the new leaf node 306EE (indicated by diagonal lines in FIG. 3B). The record manager 210 also changes the strong reference from the internal node 304BB to the internal node 306E for the key range 15-∞ to a strong reference 308DD from the internal node 304BB to the new leaf node 306EE. Because weak references 310 can only be utilized to perform read operations, no changes are made to the B+ tree 100B when adding a new record to the B+ tree 100C representing the active view.

Following the operations described above for adding a new record to the leaf node 306EE corresponding to key 19, a search operation in the active view for keys in the range of 12-∞ would follow the strong reference 308BB from the root node 302AA to the internal node 304BB. For keys in the range of 12-14, the search would follow the weak reference 310C from the internal node 304BB to the leaf node 306D in the B+ tree 100B. For keys in the range of 15-00, the search would follow the strong reference 308DD from the internal node 304BB to the leaf node 306EE in the B+ tree 100C.

Figure 3C:
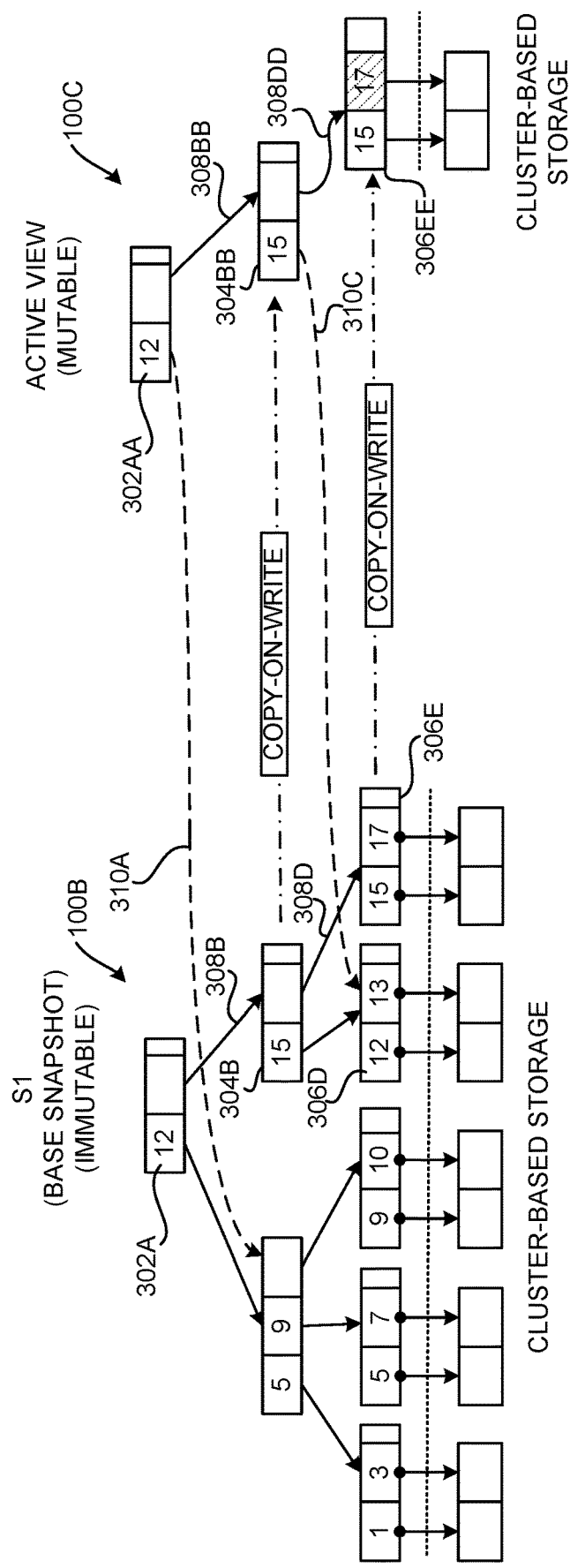
FIG. 3C is a data structure diagram illustrating additional aspects of the mechanism shown in FIG. 3B for modifying a B+ tree representing an active view having weak references to a B+ tree representing a prior snapshot.

FIG. 3C illustrates aspects of a mechanism for modifying a record in the active view. In particular, the example shown in FIG. 3C continues the example from FIG. 3A and illustrates the modification of a record corresponding to key 17 in the active view. The illustrated process can be used, for example, to define a new VCN-to-LCN mapping for a modified portion of the file represented by the B+ tree 100C.

As in the example described above with regard to FIG. 3B, the record manager 210 begins at the top of the B+ tree 100C and performs a COW operation to create a new internal node 304BB in the B+ tree 100C by making a copy of the internal node 304B from the B+ tree 100B. The record manager 210 also changes the weak reference 310B from the root node 302AA to the internal node 304B in the B+ tree 100B to a strong reference 308BB to the new internal node 304BB in the B+ tree 100C. Additionally, the record manager 210 changes the strong reference from the new internal node 304BB to the internal node 306D for the subinterval 12-14 to a weak reference 310C to the internal node 306D in the B+ tree 100B.

Progressing down the B+ tree 100C, the record manager 210 performs a COW operation to create a new leaf node 306EE in the B+ tree 100C by making a copy of the leaf node 306E in the B+ tree 100B. The record manager 210 also modifies the strong reference 308D from the internal node 304BB to the leaf node 306E for the subinterval 15-∞ to a weak reference 308DD to the new leaf node 306EE. Finally, the record manager 210 modifies the record corresponding to key 17 in the new leaf node 306EE in the desired manner (e.g., to define a new VCN-to-LCN mapping for the represented file). The modification is indicated by diagonal lines in FIG. 3C.

Following the operations described above for modifying the record corresponding to key 17, a search operation in the active view for keys in the range of 12-∞ would follow the strong reference 308BB from the root node 302AA to the internal node 304BB. For keys in the range of 12-14, the search would then follow the weak reference 310C from the internal node 304BB to the leaf node 306D in the B+ tree 100B. For keys in the range of 15-00, the search would follow the strong reference 308DD from the internal node 304BB to the leaf node 306EE in the B+ tree 100C.

Figure 3D:
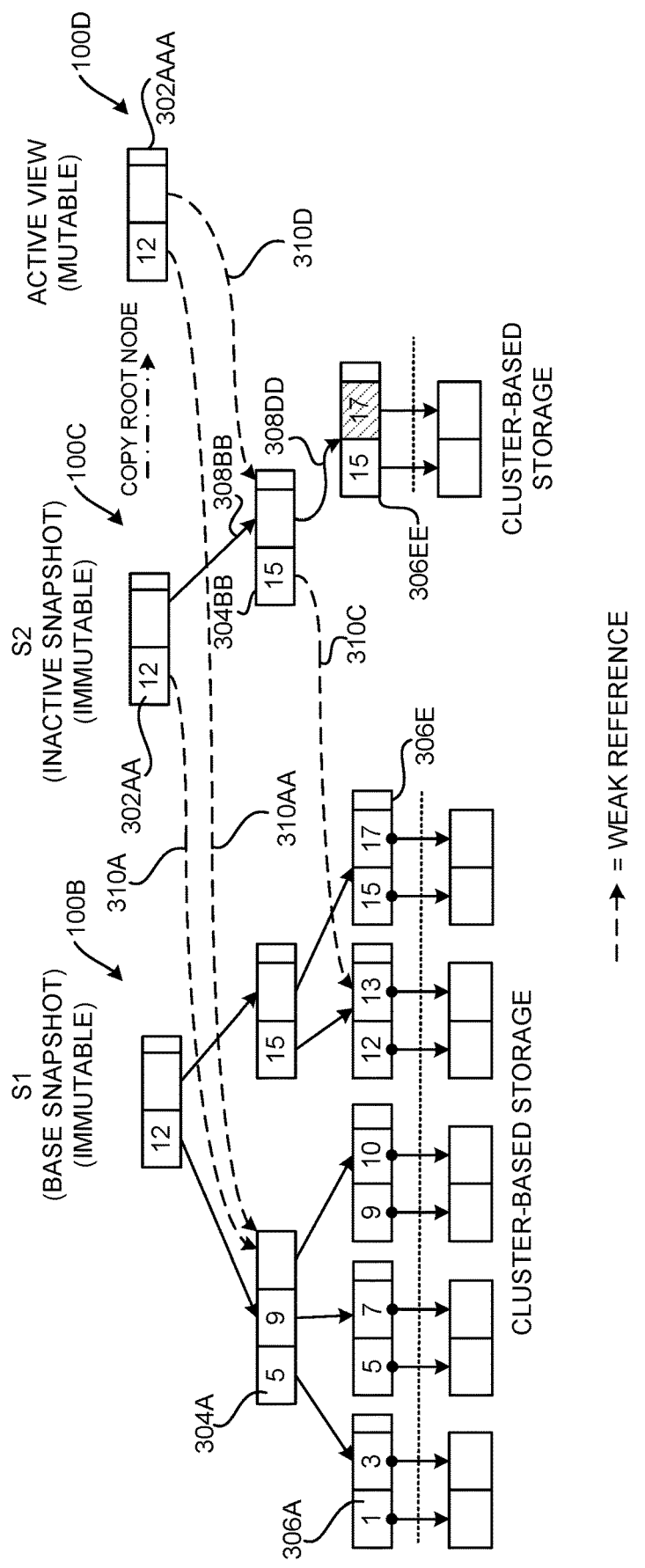
FIG. 3D is a data structure diagram illustrating additional aspects of the mechanism shown in FIG. 3A for creating a new B+ tree representing an active view that includes weak references to B+ trees representing prior snapshots.

FIG. 3D is a data structure diagram illustrating further aspects of the mechanism described above with reference to FIG. 3A for creating a new B+ tree representing an active view that has weak references to nodes in B+ trees representing previous snapshots. The example shown in FIG. 3D continues the example from FIGS. 3A and 3C. In particular, FIG. 3D illustrates operations for creating a new B+ tree 100D corresponding to a new active view that has weak references 310 to the B+ trees 100B and 100C representing the two previous snapshots. The B+ tree 100C has been modified in the manner discussed above with reference to the example presented in FIG. 3C.

In the example shown in FIG. 3D, the snapshot creator 214 has added a second snapshot through the creation of a new B+ tree 100D. In particular, the mutability manager 208 has marked the B+ tree 100C as immutable and the set manager 206 has created a new B+ tree 100D. Since the B+ tree 100C has been marked immutable, the data contained therein represents another non-modifiable point-in-time snapshot of the VCN-to-LCN mapping state of the represented file.

In order to create the new B+ tree 100D, the snapshot creator 214 creates a new root node 302AAA by making a copy of the root node 302AA of the previous point-in-time B+ tree 100C. Additionally, the snapshot creator 214 converts the strong reference 308BB in the new root node 302AAA to a weak reference 310D to the internal node 304BB in the new root node 302AAA. The weak reference 310A copied from root node 302AA when the root node 302AAA is created (referred to herein as the weak reference 310AA) is not modified. Once the B+ tree 100C has been made immutable and the new root node 302AAA in the B+ tree 100D has been created in the manner described above and made mutable, the B+ tree 100D represents the new active view.

In order to locate a given key-value mapping within the new active view, a search is made for a requested key progressively down the B+ tree 100D, starting at the root node 302AAA and following the keys, strong references 308, and weak references 310 specified by the nodes of the B+ trees 100D, 100C, and 100B, in order to locate a leaf node 306 corresponding to an appropriate subinterval.

For example, in order to locate a leaf node 306 with a key-value mapping corresponding to key 3 during the active view, the weak reference 310AA is followed from the root node 302AAA to the internal node 304A in the B+ tree 100B. The search then progresses within the B+ tree 100B from the internal node 304A to the leaf node 306A. Similarly, in order to locate a leaf node 306 with a key-value mapping corresponding to key 15, the weak reference 310D is followed from the root node 302AAA to the internal node 304BB in the B+ tree 100C. The search then progresses within the B+ tree 100C by following the strong reference 308DD from the internal node 304BB to the leaf node 306EE.

Figure 3E:
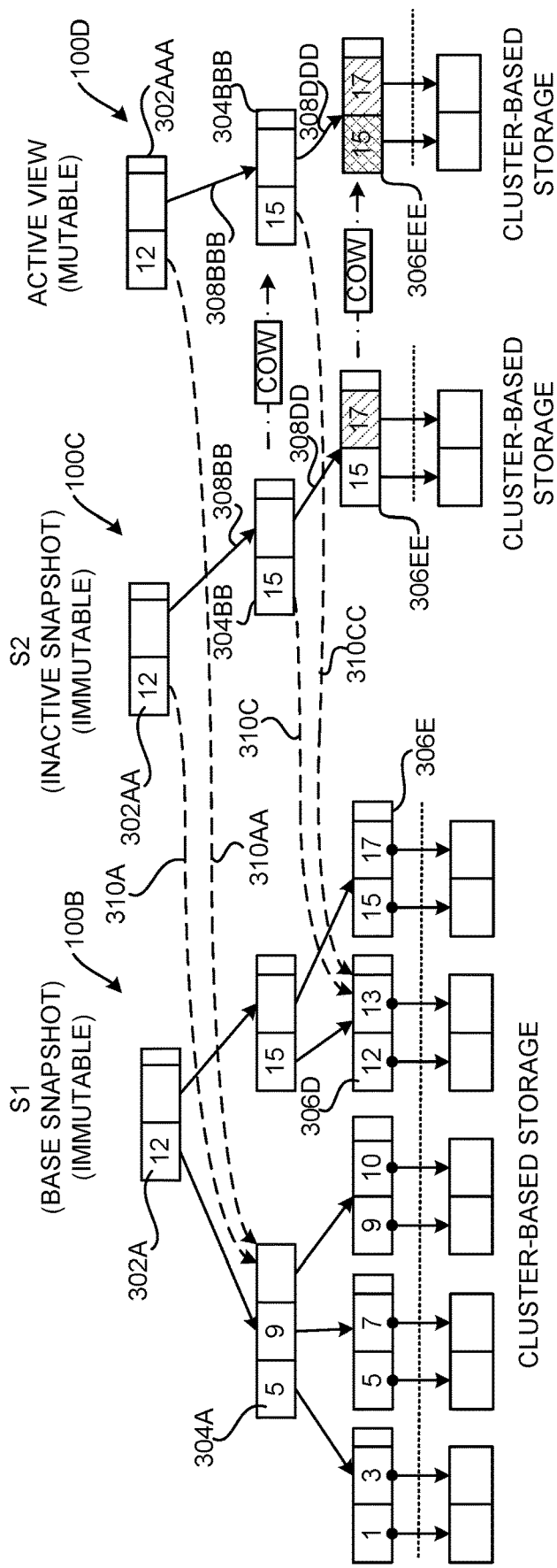
FIG. 3E is a data structure diagram illustrating additional aspects of the mechanism shown in FIGS. 3B and 3C for modifying a B+ tree representing an active view having weak references to B+ trees representing prior snapshots.

FIG. 3E is a data structure diagram illustrating further aspects of the mechanism described above with regard to FIGS. 3B and 3C for modification of a B+ tree 100 representing an active view having weak references to B+ trees representing prior snapshots. The example shown in FIG. 3E continues the example from FIG. 3C and FIG. 3D. In particular, FIG. 3E illustrates operations for modifying nodes in the B+ tree 100D, which has weak references 310AA and 310D (shown in FIG. 3D) to nodes in the B+ trees 100B and 100C, respectively.

In the example shown in FIG. 3E, a request has been received to modify the key-value pair associated with key 15 during the active view. In this example, the record in the leaf node 306EE corresponding to key 17 was previously modified in the snapshot defined by the B+ tree 100C in the manner described above with regard to FIG. 3C.

In order to modify the record corresponding to key 15 in the active view, the record manager 210 begins at the top of the B+ tree 100D and performs a COW operation to create a new internal node 304BBB in the B+ tree 100D by making a copy of the internal node 304BB in the B+ tree 100C. The record manager 210 then changes the weak reference 310D from the root node 302AAA for the subinterval 12-∞ to a strong reference 308BBB to the new internal node 304BBB.

Continuing down the B+ tree 100D, the record manager 210 performs a COW operation to create a new leaf node 306EEE in the B+ tree 100D by making a copy of the leaf node 306EE in the B+ tree 100C. The record manager 210 modifies the strong reference 308DD in the new internal node 304DDD to create a strong reference 308DDD to the new leaf node 306EEE for the subinterval 15-00.

The record manager 210 maintains the weak reference for the subinterval 0-14 from the new internal node 304BBB to the leaf node 306D in the B+ tree 100B. The weak reference from the new internal node 304BBB to the leaf node 306D in the B+ tree 100B is referred to herein as the weak reference 310CC.

The record manager 210 also modifies the record corresponding to key 15 in the new leaf node 306EEE in the desired manner (e.g., to define a new VCN-to-LCN mapping). The modification is indicated by cross-hatching in FIG. 3E.

Following the operations described above for modifying a record corresponding to key 15 in the active view, a search operation in the active view for keys in the range of 12-∞ would follow the strong reference 308BBB from the root node 302AAA to the internal node 304BBB. For keys in the range of 12-14, the search follows the weak reference 310CC from the internal node 304BBB to the leaf node 306D in the B+ tree 100B. For keys in the range of 15-00, the search follows the strong reference 308DDD from the internal node 304BBB to the leaf node 306EEE in the B+ tree 100D.

Using the mechanism described above with regard to FIGS. 3A and 3D, new filesystem snapshots can be created in O(1) time complexity. Using the mechanism described above with regard to FIGS. 3B, 3C, and 3E, filesystem snapshots can be modified (e.g., adding, modifying, or deleting records) in O(log N) time complexity.

Additional details regarding the mechanism described above for creating a new B+ tree representing an active view of a dataset with weak references to B+ trees corresponding to previous snapshots are provided below with regard to FIG. 4. Additional details regarding the mechanism described above for searching a B+ tree representing an active view containing weak references to prior snapshots are provided below with regard to FIG. 5. Additional details regarding the mechanism described above for updating a B+ tree representing an active view having weak references to B+ trees representing prior snapshots are provided below with regard to FIG. 6.

Figure 4:
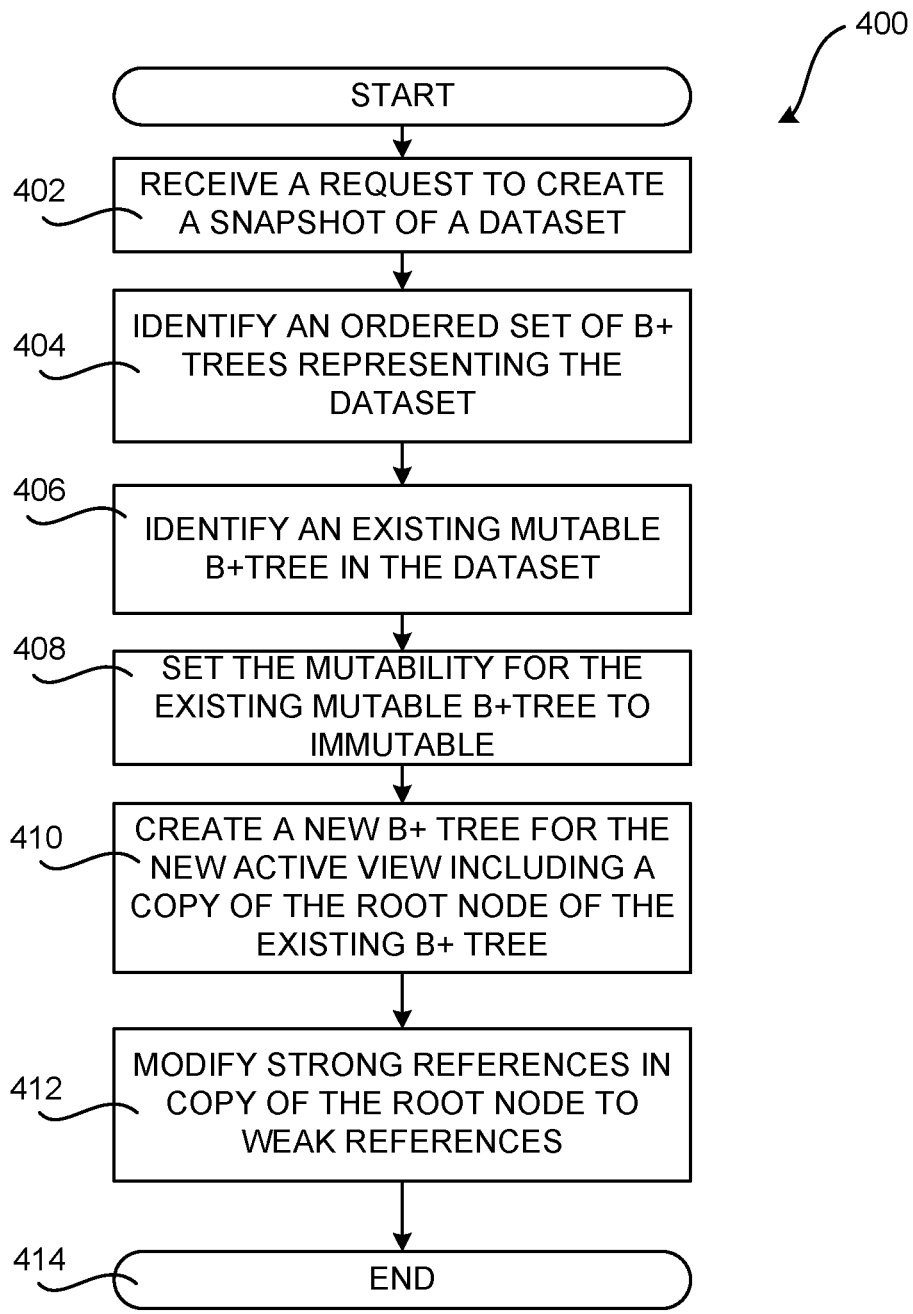
FIG. 4 is a flow diagram showing a routine that illustrates further aspects of the mechanism shown in FIGS. 3A and 3D for creating a new B+ tree representing an active view that includes weak references to B+ trees representing prior snapshots.

FIG. 4 is a flow diagram showing a routine 400 that illustrates aspects of the example mechanism described above with reference to FIGS. 3A and 3D for creating a new B+ tree 100 representing an active view that contains weak references 310 to B+ trees 100 representing prior snapshots, according to one embodiment. The routine 400 begins at operation 402, where the B+ tree manager 204 receives a request to create a new snapshot of the dataset 220. Responsive to the request, the routine 400 proceeds from operation 402 to operation 404, where the set manager 206 identifies an ordered set of B+ trees 100 that represent the dataset 220. The routine 400 then proceeds from operation 404 to operation 406.

At operation 406, the mutability manager 208 identifies an existing mutable B+ tree 100 in the ordered set of B+ trees 100 identified at operation 404. In the example shown in FIG. 3E, for instance, the B+ tree 100D is mutable and the B+ trees 100B and 100C are immutable. Once the mutability manager 208 has identified an existing mutable B+ tree 100, the routine 400 proceeds from operation 406 to operation 408 where the mutability manager 208 sets the mutability for the existing mutable B+ tree 100 to immutable. The routine 400 then proceeds from operation 408 to operation 410.

At operation 410, the B+ tree manager 204 then creates a new B+ tree 100 representing the new active view of the dataset 220. As discussed above with regard to FIGS. 3A and 3D, the B+ tree manager 204 creates the new B+ tree 100 by copying the root node 302 of the existing mutable B+ tree 100. The B+ tree manager 204 then changes any strong references 308 in the new root node to weak references 310 in the manner described above. This occurs at operation 412. The mutability manager 208 then sets the mutability for the new B+ tree 100 to mutable. From operation 412, the routine 400 proceeds to operation 414, where it ends.

Figure 5:
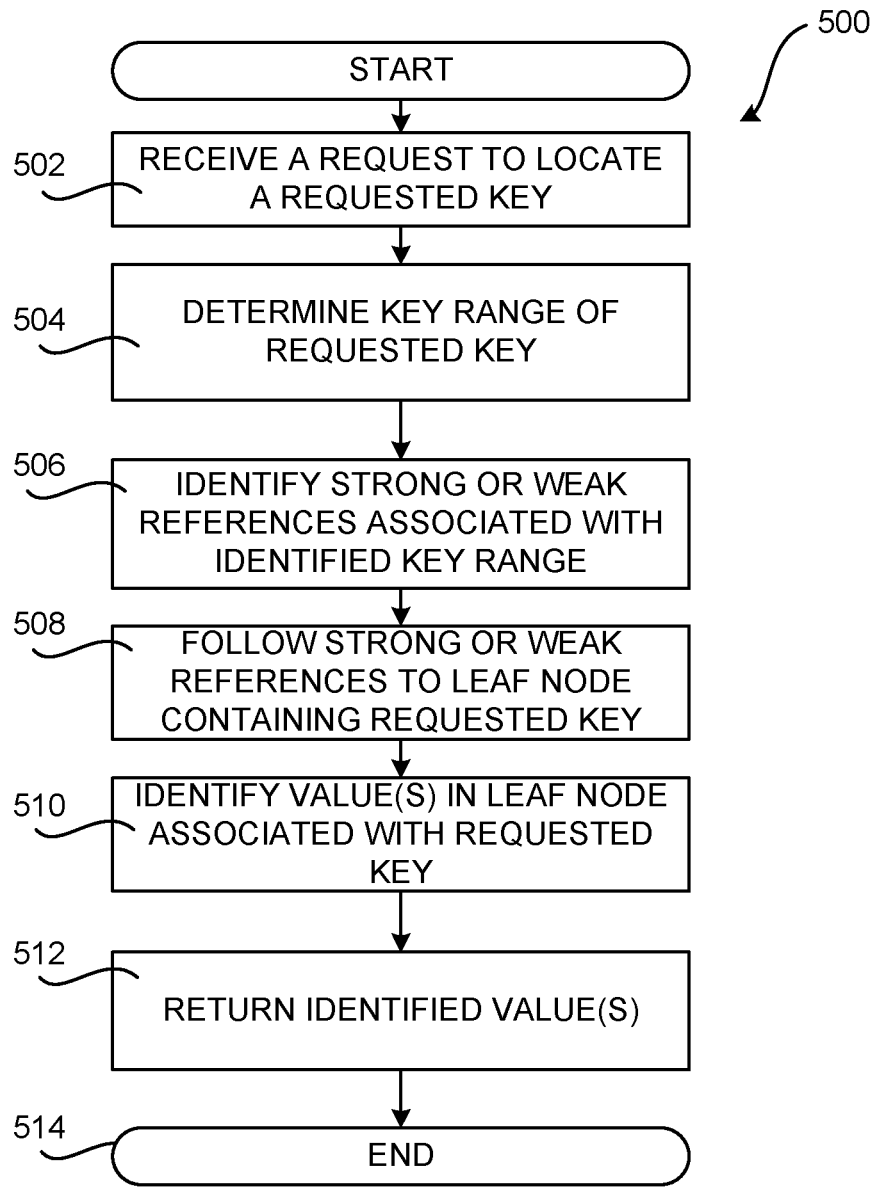
FIG. 5 is a flow diagram showing a routine that illustrates aspects of the example mechanism shown in FIGS. 3A-3E for searching a B+ tree representing a snapshot having weak references to B+ trees representing prior snapshots, according to embodiments.

FIG. 5 is a flow diagram showing a routine 500 that illustrates aspects of the example mechanism described above with reference to FIGS. 3A-3E for searching a B+ tree 100 that has weak references 310 to other B+ trees 100 representing snapshots of the dataset 220, according to one embodiment. The routine 500 begins at operation 502, where the request manager 212 receives a request to locate a key in a B+ tree 100. Responsive to receiving the request, the routine 500 proceeds to operation 504, where the request manager 212 determines the key range of the requested key. The routine 500 then proceeds from operation 504 to operation 506.

At operation 506, the request manager 212 identifies a strong or weak reference in the root node 302 of the relevant B+ tree 100 associated with the key range identified at operation 504. The routine 500 then proceeds from operation 506 to operation 508, where the request manager 212 follows the identified strong or weak reference to an internal node 304 in the B+ tree 100. This process continues until the search arrives at a leaf node 306 corresponding to the key range of the requested key.

Once the request manager 212 has identified a leaf node 306 that corresponds to the key range of the requested key, the routine 500 proceeds from operation 508 to operation 510. At operation 510, the request manager 212 identifies a value or values, if any, stored in the leaf node 306 that are associated with the requested key. The routine 500 then proceeds from operation 510 to operation 512, where the request manager 212 returns the identified value, or values, if any. If no value is present, the request manager 212 returns an indication that the requested key is not present. The routine 500 then proceeds from operation 512 to operation 514, where it ends.

Figure 6:
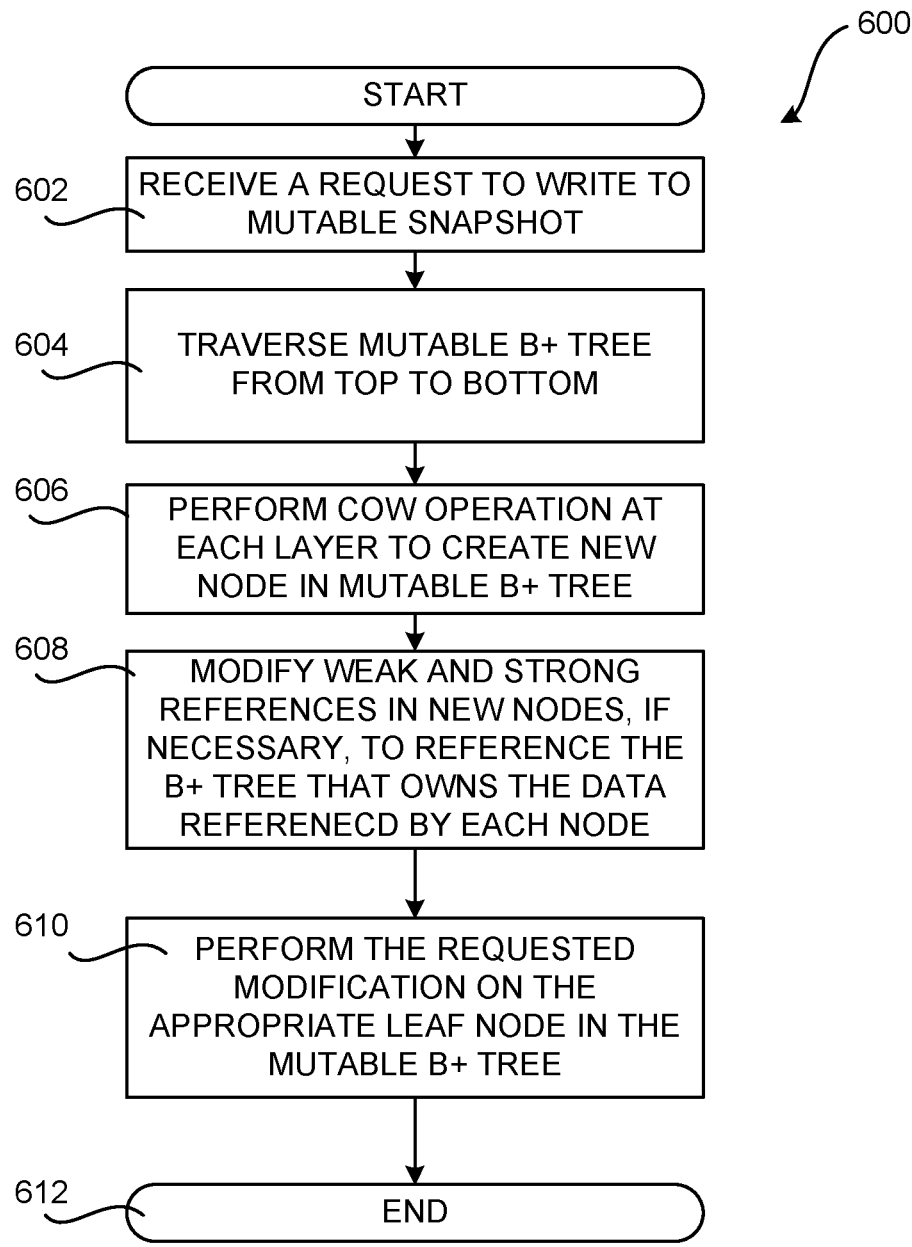
FIG. 6 is a flow diagram showing a routine that illustrates aspects of the example mechanism shown in FIGS. 3B, 3C, and 3D for modifying records in a B+ tree representing an active view that has weak references to B+ trees representing prior snapshots, according to embodiments, according to embodiments.

FIG. 6 is a flow diagram showing a routine 400 that illustrates aspects of the example mechanism described above with reference to FIGS. 3B, 3C, and 3E for modifying (e.g., adding records, deleting records, or modifying records) a B+ tree representing an active view of a dataset 220 that has weak references 310 to B+ trees representing snapshots of the dataset 220, according to one embodiment. The routine 600 begins at operation 602, where the request manager 212 receives a request to write to a mutable B+ tree 100 representing the active view of a dataset 220. For example, the request manager 212 may receive a request to write a new record to a mutable B+ tree 100, delete a record from a mutable B+ tree 100, or modify an existing record in a mutable B+ tree 100.

Responsive to the request to modify the B+ tree 100 representing the active view received at operation 602, the routine 600 proceeds to operation 604, where the request manager 212 traverses the mutable B+ tree 100 beginning at the top. At each level of the mutable B+ tree 100, the request manager 212 performs a COW operation, if necessary, to create a new node in the mutable B+ tree 100. This occurs at operation 606.

At each level of the mutable B+ tree 100, the request manager 212 also modifies the weak references 310 and the strong references 308 for each key range of newly created nodes, if necessary, to properly reference the B+ tree 100 storing the data referenced by each key range. For example, if the mutable B+ tree 100 stores the referenced data, then the request manager 212 will change a weak reference 310 to the newly created node to a strong reference. If an immutable B+ tree 100 stores the referenced data, the request manager 212 will change a strong reference 308 to a weak reference 310, if present. The process describe above with respect to operations 606 and 608 continues at each level of the mutable B+ tree 100.

From operation 608, the routine 600 proceeds to operation 610, where the request manager 212 performs the requested modification (e.g., adding, deleting, or modifying) to the record in the leaf node 306 corresponding to the relevant key range. The routine 600 then proceeds from operation 610 to operation 612, where it ends.

FIGS. 7A-7D are data structure diagrams illustrating aspects of a mechanism disclosed herein for deleting a B+ tree 100 representing a snapshot having weak references 310 to or from nodes in other B+ trees 100 representing other snapshots. In FIGS. 7A-7D, snapshots are deleted and data that is no longer utilized by the deleted snapshots is erased and reclaimed. Utilizing the mechanism shown in FIGS. 7A-8 and described below, B+ trees 100 representing adjacent B+ trees 100 corresponding to filesystem snapshots can be merged in O(size of A) time complexity.

Figure 7A:
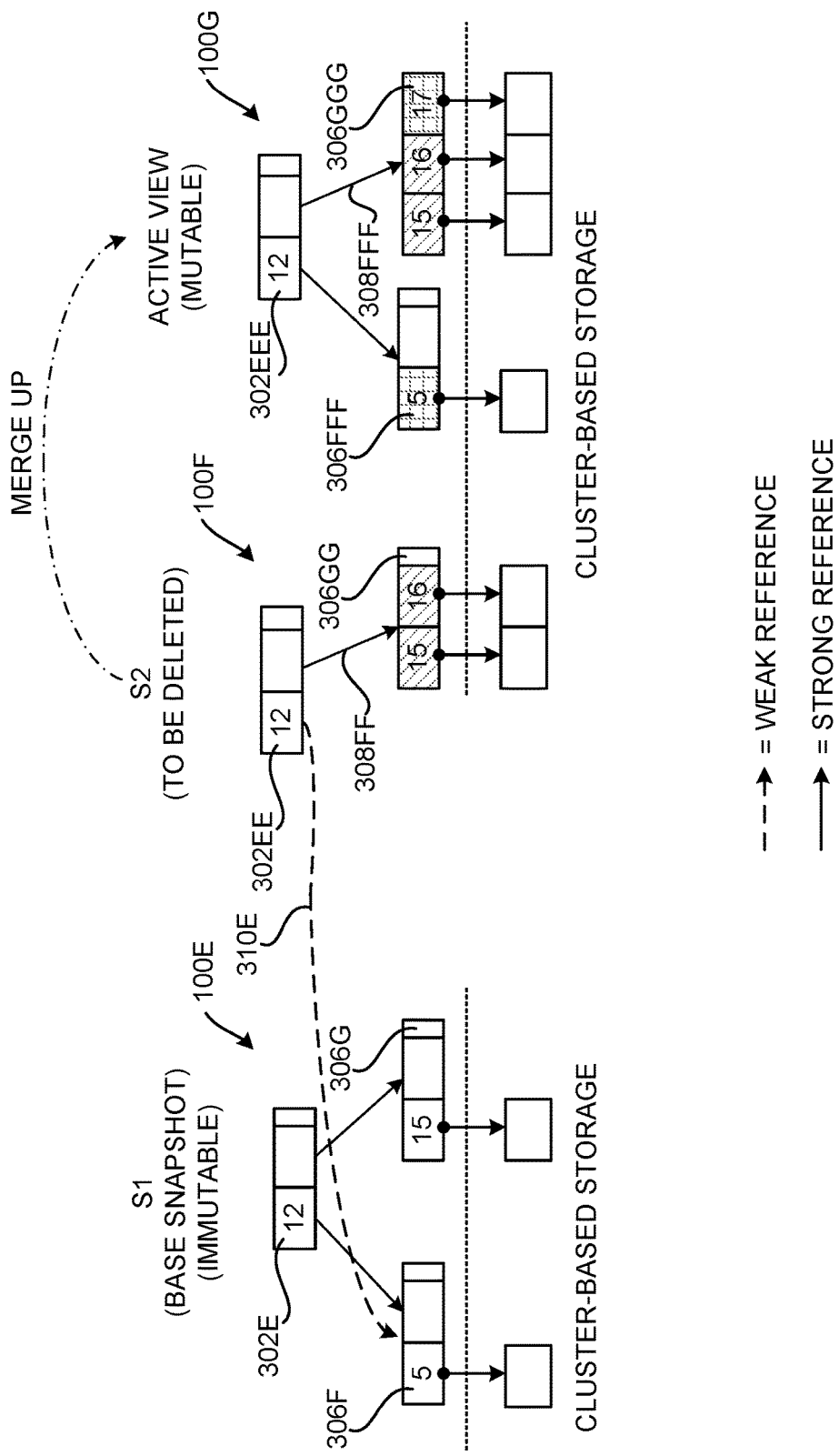
FIG. 7A is a data structure diagram illustrating aspects of a mechanism disclosed herein for deleting a B+ tree representing a snapshot having weak references to or from nodes in other B+ trees representing other snapshots.

In the example shown in FIG. 7A, an ordered set of B+ trees 100 has been created corresponding to a snapshot of filesystem metadata for a file. A first B+ tree 100E includes a root node 302E and two leaf nodes 306F and 306G. The root node 302E of the B+ tree 100E includes a strong reference to the leaf node 306F for the subinterval 0-11 and a strong reference to the leaf node 306G for the subinterval 12-00.

The ordered set of B+ trees 100 shown in FIG. 7A also includes a B+ tree 100F corresponding to another, later, point-in-time snapshot of the filesystem metadata. The B+ tree 100F was created in the manner described above (e.g., by creating a copy of the root node 302E of the B+ tree 100E and changing the strong references to the leaf nodes 306F and 306G in the copy of the root node 302E to weak references).

During the snapshot lifetime represented by the B+ tree 100F, updates were made to the records associated with keys 15 and 16. Consequently, a COW operation created a copy of the leaf node 306G (the leaf node 306GG) and wrote the updates to the leaf node 306GG. The weak reference from the root node 302EE to the leaf node 306G for the subinterval 12-∞ was changed to a strong reference 308FF to the leaf node 306GG.

The ordered set of B+ trees 100 shown in FIG. 7A also includes a mutable B+ tree 100G corresponding to the active view of the filesystem metadata. The B+ tree 100G was created in the manner described above (e.g., by creating a copy of the root node 302EE of the B+ tree 100E and changing the strong reference to the leaf node 306GG in the copy of the root node 302EE to a weak reference).

Updates were also made to the records associated with keys 5 and 17 in the active view represented by the B+ tree 100G. As a result, a COW operation created a copy of the leaf node 306GG (the leaf node 306GGG) and wrote the updates to the value associated with key 17 to the leaf node 306GGG. The weak reference from the root node 302EEE to the leaf node 306GG was changed to a strong reference 308FFF to the leaf node 306GGG. Another COW operation created a copy of the leaf node 306FF (the leaf node 306FFF) and wrote the updates to the value associated with key 5 to the leaf node 306FFF. The weak reference from the root node 302EEE to the leaf node 306F in the B+ tree 100E for the subinterval 0-11 was changed to a strong reference to the leaf node 306FFF.

Following the creation of the ordered set of B+ trees 100E-100G shown in FIG. 7A and modification of the B+ trees 100E-100G in the manner described above, the snapshot deletor 216 received a request to delete the snapshot referenced by the B+ tree 100F. In order to delete the B+ tree 100F, the snapshot deletor 216 merges the B+ tree 100F with a neighbor B+ tree (e.g., the B+ tree 100E or the B+ tree 100G). In the illustrated example, the B+ tree 100F is "merged up" with the B+ tree 100G. The B+ tree 100F could also be "merged down" with the B+ tree 100E in other examples.

In the example illustrated in FIG. 7A, the B+ tree 100F is immutable and the B+ tree 100G with which it is to be merged is mutable. In this scenario, modifications can be made directly to the B+ tree 100G since it represents the active view and is, therefore, mutable. However, and as will be described in greater detail below with regard to FIGS. 7C and 7D, a modified merging process is performed when both B+ trees 100 to be merged are immutable.

In an embodiment, the snapshot deletor 216 merges an immutable B+ tree 100 (e.g., the B+ tree 100F) and a mutable B+ tree 100 (e.g., the B+ tree 100G) by first enumerating the leaf nodes 306 of the B+ tree 100 to be deleted. For each leaf node 306 in the B+ tree to be deleted, the snapshot deletor 216 determines a merger action to be taken. In an embodiment, the particular merger action to be performed on a given leaf node 306 is based upon the type of references (e.g., strong reference or weak references) to the leaf node 306 in the B+ tree to be deleted and the corresponding leaf node 306 in the neighbor B+ tree 100 (e.g., the B+ tree 100G in the example shown in FIG. 7A).

In the example shown in FIG. 7A, the snapshot deletor 216 enumerates the leaf nodes 306F and 306GG of the B+ tree 100F to be deleted. The snapshot deletor 216 then identifies the type of references associated with the leaf nodes 306F and 306GG and their corresponding leaf nodes 306FFF and 306GGG, respectively, in the B+ tree 100G. The snapshot deletor 216 then selects the particular merger action to be performed on each node based upon the types of the identified references.

In the example shown in FIG. 7A, the leaf node 306F has an associated weak reference 310E from the root node 302EE and the corresponding leaf node 306FFF in the B+ tree 100G has an associated strong reference from the root node 302EEE. In the case of a leaf node having an associated weak reference 310 in the B+ tree 100 to be deleted and a leaf node having an associated strong reference 308 in the neighbor B+ tree 100, the record in the neighbor B+ tree is kept and the weak reference 310 to the leaf node 306 in the previous snapshot lifetime is deleted. In the illustrated example, this means that the leaf node 306FFF in the B+ tree 100G is not modified and the weak reference 310E is deleted.

Figure 7B:
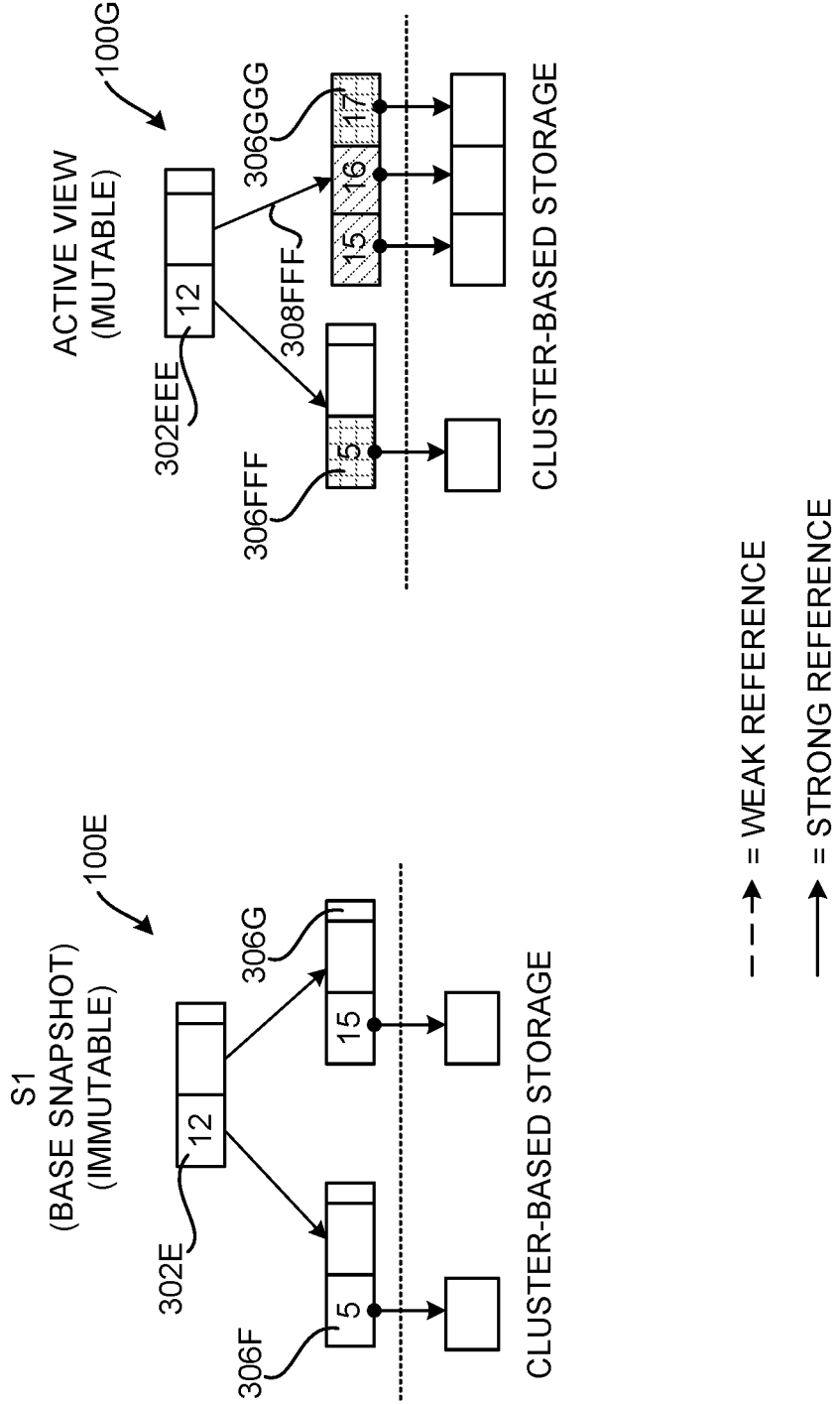
FIG. 7B is a data structure diagram illustrating further aspects of the mechanism shown in FIG. 7A for deleting a B+ tree representing a snapshot having weak references to or from nodes in other B+ trees representing other snapshots.

In the example shown in FIG. 7A, the leaf node 306GG has an associated strong reference 308FF from the root node 302EE and the corresponding leaf node 306GGG in the B+ tree 100G has an associated strong reference 308FFF from the root node 302EEE. In the case of a leaf node 306 having an associated strong reference 308 in the B+ tree 100 to be deleted and a leaf node 306 having an associated strong reference 308 in the neighbor B+ tree 100, the record in the neighbor B+ tree is kept and the leaf node 306 in the B+ tree 100 to be deleted is freed. In the illustrated example, this means that the leaf node 306GGG in the B+ tree 100G is not modified and the leaf node 306GG is deleted and the memory that it previously occupied is freed. FIG. 7B shows the contents of the B+ tree 100E and the B+ tree 100G following the deletion of the B+ tree 100F in the manner described above.

FIGS. 7C and 7D provide another example of the mechanism for deleting a B+ tree 100 described above with reference to FIGS. 7A and 7B. In the example shown in FIGS. 7C and 7D, an ordered set of B+ trees 100 includes the B+ tree 100E, the B+ tree 100F, and the B+ tree 100G.

In this example, the B+ tree 100E includes a root node 302E having strong references to leaf nodes 306F and 306G.

The B+ tree 100F shown in FIG. 7C includes a root node 302EE created from the root node 302E in the manner described above. The root node 302EE includes a weak reference 310E to the leaf node 306F in the B+ tree 100E. Records corresponding to keys 15 and 16 were modified during the lifetime of the snapshot represented by the B+ tree 100F. Consequently, the B+ tree 100F includes a leaf node 306GG and the root node 302EE includes a strong reference to the leaf node 306GG.

The B+ tree 100G shown in FIG. 7C includes a root node 302EEE created from the root node 302EE in the manner described above. Consequently, the root node 302EE stores a weak reference to the leaf node 306F in the B+ tree 100E for the subinterval 0-11 and a weak reference to the leaf node 306GG in the B+ tree 100F for the subinterval 12-00.

In the example shown in FIG. 7C, the snapshot deletor 216 has received a request to delete the snapshot represented by the B+ tree 100E, which is immutable. In response thereto, the snapshot deletor 216 has identified a neighbor B+ tree 100F with which the B+ tree 100E is to be merged in order to delete the snapshot as requested.

Because the B+ tree 100F is immutable and contains data that might be referenced by B+ trees 100 corresponding to future snapshots, changes cannot be made to the metadata stored in the B+ tree 100F when merging the B+ tree 100E up with the B+ tree 100F. Consequently, the merger process is modified slightly when merging two B+ trees 100 that are both mutable. This process is described below.

As in the example presented above with regard to FIGS. 7A and 7B, the snapshot deletor 216 enumerates the leaf nodes 306F and 306G of the B+ tree 100E to be deleted. The snapshot deletor 216 then identifies the type of references (e.g., weak or strong) associated with the leaf nodes 306F and 306G and their corresponding nodes in the neighbor B+ tree 100F. The snapshot deletor 216 then selects the particular merger action to be performed on each node based upon the types of the identified references.

In the example shown in FIG. 7C, the leaf node 306G has an associated strong reference from the root node 302E and the corresponding leaf node 306GG in the B+ tree 100G has an associated strong reference from the root node 302EE. As discussed above, in the case of a leaf node 306 having an associated strong reference 308 in the B+ tree 100 to be deleted and a leaf node 306 having an associated strong reference 308 in the neighbor B+ tree 100 with which it is to be merged, the record in the neighbor B+ tree 100 is kept and the leaf node 306 in the B+ tree 100 to be deleted is freed. In the illustrated example, this means that the leaf node 306GG in the B+ tree 100F is not modified and that the leaf node 306G in the B+ tree 100E is deleted and the memory that it previously occupied is freed.

In the example shown in FIG. 7C, the leaf node 306F has an associated strong reference from the root node 302E and weak references 310 and 310EE from the root node 302EE and the root node 302EEE, respectively. In the case of a leaf node 306 having an associated strong reference 308 in the B+ tree 100 to be deleted and a leaf node 306 having an associated weak reference 310 in the neighbor B+ tree 100 with which it is to be merged, the leaf node 306 in the B+ tree 100 to be deleted would typically be "pushed" into the neighbor B+ tree 100. This would not be problematic if the destination B+ tree 100 (e.g., the B+ tree 100F in the example shown in FIG. 7C) were mutable. In the illustrate example, however, the destination B+ tree 100F is immutable.

In order to address the technical challenge described above, the snapshot deletor 216 utilizes a weak-to-strong table 702, in an embodiment. As will be described in greater detail below, data in the weak-to-strong table 702 is utilized to determine when the identified leaf nodes, and the data they reference, can be freed in a subsequent snapshot delete operation. The weak-to-strong table 702 is utilized because the corresponding B+ tree nodes in the are not modifiable in-place and may be referenced by dependent B+ tables.

The weak-to-strong table 702 stores data identifying leaf nodes 306 in a B+ tree 100 to be deleted where there is a strong reference 308 to a leaf node 306 in the B+ tree to be deleted and a weak reference 310 to the corresponding leaf node 306 in the neighbor B+ tree 100. In the example shown in FIG. 7C, for instance, a weak-to-strong table 702 associated with the B+ tree 100F includes data identifying the leaf node 306F, which has a strong reference from the root node 303E and weak references 310E and 310EE from the root nodes 302EE and 302EEE, respectively.

Through the use of the weak-to-strong table 702, the merging process described above can merge two immutable B+ trees 100. When a B+ tree 100 is to be deleted, the weak-to-strong table 702 associated with the B+ tree 100 can also be consulted to determine whether any leaf nodes 306 identified in the weak-to-strong table 702 can be deleted. FIG. 7D shows the contents of the B+ tree 100F and the B+ tree 100G following the deletion of the B+ tree 100E in the manner described above.

Figure 8:
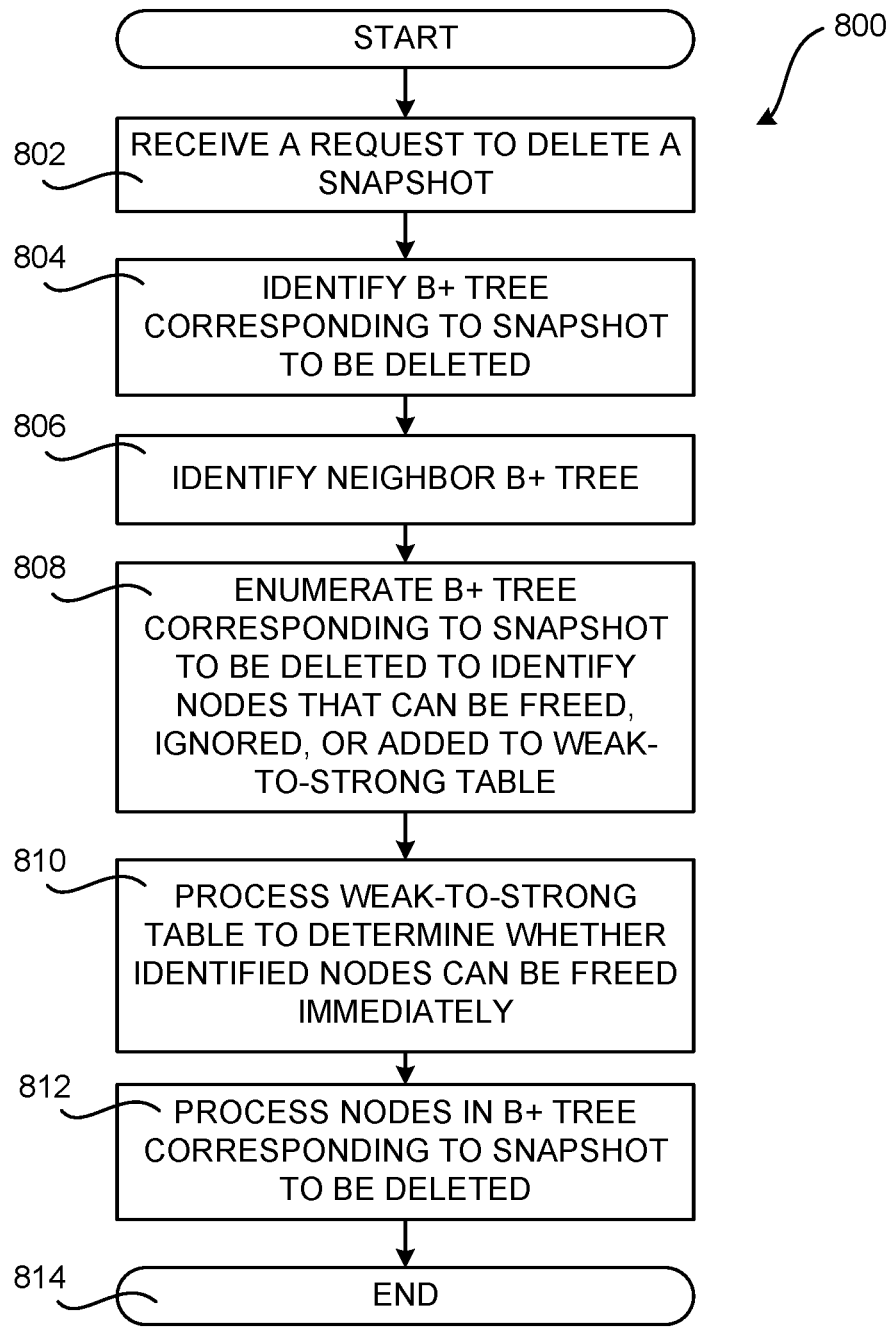
FIG. 8 is a flow diagram showing a routine that illustrates aspects of the example mechanism shown in FIGS. 7A-7D for deleting a B+ tree representing a snapshot that has weak references to or from other B+ trees representing other snapshots, according to embodiments.

FIG. 8 is a flow diagram showing a routine 800 that illustrates aspects of the example mechanism shown in FIGS. 7A-7D for deleting a B+ tree 100 representing a snapshot that has weak references 310 to or from other B+ trees 100 representing other snapshots, according to embodiments. The routine 800 begins at operation 802, where the snapshot deletor 216 receives a request to delete a snapshot represented by a B+ tree 100.

In response to receiving a request to delete a snapshot at operation 802, the routine 800 proceeds to operation 804, where the snapshot deletor 216 identifies the B+ tree 100 corresponding to the snapshot to be deleted. The routine 800 then proceeds from operation 804 to operation 806, where the snapshot deletor 216 identifies a neighbor B+ tree 100 to the B+ tree 100 corresponding to the snapshot to be deleted.

In the examples described above, the neighbor B+ tree 100 represents a snapshot taken a point in time later than the time the snapshot represented by the B+ tree 100 to be deleted was taken. As discussed above, however, the neighbor B+ tree 100 might alternately represent a snapshot taken a point in time earlier than the time the snapshot represented by the B+ tree 100 to be deleted was taken.

From operation 806, the routine 800 proceeds to operation 808, where the snapshot deletor 216 enumerates the leaf nodes 306 of the B+ tree 100 corresponding to the snapshot to be deleted. The snapshot deletor 216 then identifies the type of references (e.g., weak or strong) associated with each of the enumerated leaf nodes 306 and their corresponding leaf nodes 306 in the neighbor B+ tree 100 selected at operation 806. The snapshot deletor 216 then selects the particular merger action to be performed (e.g., deleting a leaf node 306, ignoring a leaf node 306, or adding a leaf node 306 to a weak-to-strong table 702) with respect to each leaf node 306 based upon the combination of reference types (e.g., weak/strong, strong/strong, strong/weak, weak/weak).

As discussed above, the snapshot deletor 216 utilizes a weak-to-strong table 702 associated with the neighbor B+ tree 100 in the case where the B+ tree 100 corresponding to the snapshot to be deleted and the neighbor B+ tree 100 with which it is to be merged are both immutable. In particular, at operation 808, the snapshot deletor 216 adds data to the weak-to-strong table 702 associated with the neighbor B+ tree 100 that identifies leaf nodes 306 in the B+ tree 100 to be deleted where there is a strong reference 308 to a leaf node 306 in the B+ tree 100 to be deleted and a weak reference 310 to the corresponding leaf node 306 in the neighbor B+ tree 100. The snapshot deletor 216 then processes the weak-to-strong table 702 associated with the neighbor B+ tree 100 at operation 810.

From operation 810, the routine 800 proceeds to operation 812, where the snapshot deletor 216 implements the merger actions selected at operation 808 for the enumerated leaf nodes 306 of the B+ tree 100 corresponding to the snapshot to be deleted. The routine 800 then proceeds from operation 812 to operation 814, where it ends.

Table 1, below, sets forth pseudocode that provides a more detailed description of the mechanism described above for merging two B+ trees, according to an embodiment. Generally, both the B+ tree 100 to be deleted and the neighbor B+ tree 100 with which the B+ tree 100 to be deleted is to be merged are enumerated at the leaf level. If the neighbor B+ tree 100 has a weak reference 310 on a path to a leaf node 306, the exact same node is being considered in both B+ trees 100 since the weak reference 310 points to the exact same node in the B+ tree 100 to be deleted. When this occurs, the merging process walks up the B+ tree 100 until a mismatching node is located. This will occur at least when the root node 302 is reached. Then, the weak references 310 and the strong references 308 for the key range at that level are reconciled and the key range at that level is deleted from the B+ tree 100 to be deleted. This process then repeats from the beginning. Additional details regarding these operations are provided below in Table 1.

1. Mark the snapshot to be deleted as 'dead' to forbid future read attempts. Then, incrementally merge the dead snapshot (referred to as SourceTree) into the next newer version (referred to as TargetTree).
2. Initialize SourceNode to the root node of SourceTree and Level to the RootLevel of the Source Tree.
3. Enumerate the SourceNode, Level of SourceTree and capture KeyRange, WeakOrStrong for the first key.
    a. If WeakOrStrong is "Weak", delete the entry in SourceTree because it is owned by an earlier snapshot and must match at least part of some strong ref key range in an older snapshot.
4. Find KeyRange in the TargetTree at Level.
    a. If KeyRange overlaps with FoundRange but does not match exactly, split KeyRange along the intersection to form non-overlapping or fully matching ranges. Go back to 4.
    b. If the TargetTree's RootLevel is shallower than Level, initialize Level to the target RootLevel and go back to
3.
    c. If the KeyRange exists at Level in TargetTree, capture TargetNode, and TargetWeakOrStrong:
        i. If TargetNode is a 'hole' in the table (the node does not exist), we should enumerate the subtree reachable from SourceNode and free everything that is a strong ref and delete everything that is a weak ref. This means that KeyRange was deleted in the Target snapshot version and will be inaccessible after the merge.
        ii. If TargetWeakOrStrong is "weak", try to make the target node "strong". This could involve adding an entry to the "weak-to-strong" table capturing the level and key range to make strong.
1. If the weak-to-strong table already has a strong reference for the node, it is actually "strong", so fall through.
2. If this is a mutable "active view", directly modify the weak reference to a strong reference. No weak-to-strong table should exist.
3. If marking the node strong succeeds, processing of this node is completed by transferring ownership up. Delete the SourceNode from the dead snapshot and go to 2.
iii. Otherwise, TargetWeakOrStrong must be a strong reference and an intersection of two strong references needs to be reconciled.
1. If SourceNode is empty, free the node and delete the reference to it in TargetTree. Go to step 2.
2. If Level is "leaf", free and delete the entry. Go to step 2. (This operation may be optimized to reconcile all entries on a leaf page that intersect rather than restarting).
3. Otherwise, set Level to the next lower level of the tree (toward the leaf). Go to Step 3.
5. At this point the SourceTree should be empty.
6. Enumerate the SourceWeakToStrongTable and capture KeyRange, Level, SourceNode. These are the strong nodes that were transferred up by previous merge operations.
c. Delete this entry from SourceWeakToStrongTable.
d. Go to Step 4 to merge the strong node into the next higher table.

Table 1—Example Pseudocode for Merging B+ Trees

Figure 9:
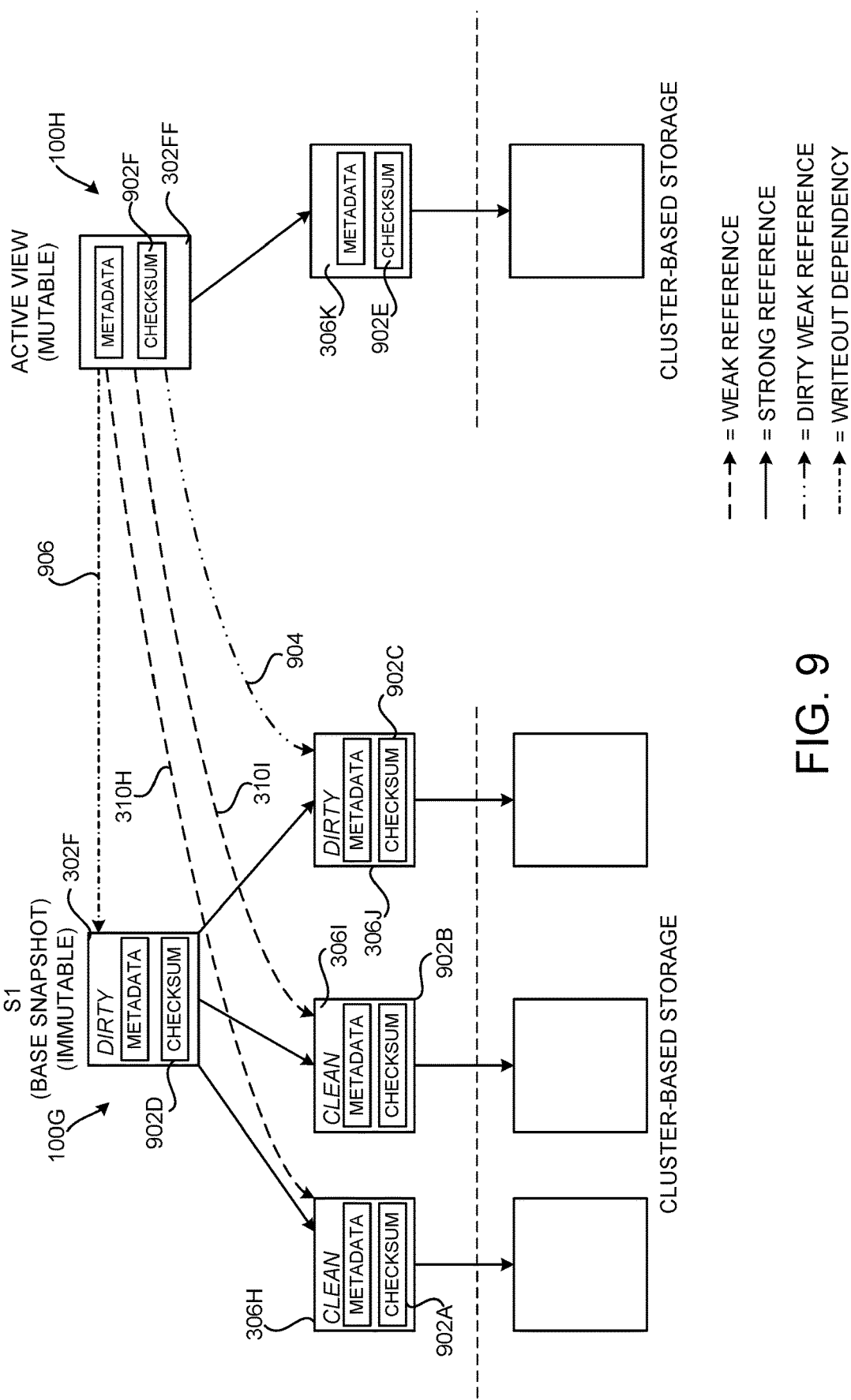
FIG. 9 is a data structure diagram illustrating aspects of a mechanism disclosed here for creating and persisting a B+ tree representing a new active view when nodes in a B+ tree referenced by weak references are dirty.

FIG. 9 is a data structure diagram illustrating aspects of a mechanism disclosed here for creating and persisting a B+ tree 100 representing a new snapshot when nodes in another B+ tree 100 referenced by weak references 310 are dirty. As mentioned above, a dirty node in a B+ tree 100 is a node that is stored in memory with contents that do not match the version of the node that has been persisted to mass storage.

In the example shown in FIG. 9, a B+ tree 100G has been created that represents a snapshot of filesystem metadata. The B+ tree has a root node 302F and three leaf nodes 306H, 306I, and 306J. Each of the nodes 306H-306J and 302F stores a checksum 902A-902D, respectively. The checksums 902A-902C stored in the leaf nodes 306H-306J, respectively, are checksums of the metadata stored therein and, optionally, the data referenced by the leaf nodes 306H-306J. The checksum 902D of the root node 302F is a checksum of the metadata stored therein and the checksums 902A-902C of the leaf nodes 306H-306J.

The checksums 902 are propagated up the B+ tree 100G tree from leaf nodes 306 toward the root node 302 since each node's checksums 902 are computed based on checksums from lower nodes in the B+ tree 100G. The processing system 200 computes the checksums as part of the process that writes out each B+ tree 100 to persistent storage.

In the example shown in FIG. 9, a new snapshot has been created in the manner described above by creating a new B+ tree 100H representing the active view. As discussed above, the root node 302FF of the new B+ tree 100H is created by making a copy of the root node 302F of the B+ tree 100G representing the previous snapshot. Additionally, strong references in the new root node 302F are converted to weak references to the nodes in the B+ tree 100G representing the previous snapshot as described above. In the example shown in FIG. 9, for instance, the strong references to the leaf nodes 306H-306J may be converted to weak references 310.

In order to account for the possibility that nodes in the B+ tree 100G are dirty at the time the B+ tree 100H is created, any references in the new root node 302FF to nodes in the B+ tree 100G that are dirty are converted to dirty weak references 904. Accordingly, in the example shown in FIG. 9, strong references to the leaf nodes 902A and 902B have been converted to weak references 310H and 310I, respectively. The strong reference to the leaf node 306J, however, has been converted to a dirty weak reference 904. The dirty weak reference 904 indicates that an updated checksum 902 for a referenced node is to be obtained and utilized to compute new checksums in the referencing B+ tree prior to persisting the B+ tree 100 to mass storage.

Additionally, a writeout dependency 906 has been created from the B+ tree 100H to the B+ tree 100G. The writeout dependency 906 indicates that the checksums for at least some of the nodes in the B+ tree 100G are to be updated prior to updating the checksums for nodes in the B+ tree 100H.

In order to persist the B+ tree 100H to mass storage, the dataset manager 202 utilizes the dirty weak reference 904 to collect an updated checksum for the leaf node 306J in the B+ tree 100G. The dataset manager 202 then utilizes the updated checksum to compute one or more new checksums for nodes in the B+ tree 100H. In the illustrated example, for instance, the dataset manager 202 computes a checksum 902F for the root node 302FF using the updated checksum for the leaf node 306J and the checksum for the leaf node 306K. Once the checksum 902F has been updated, the dataset manager 202 can persist the updated B+ tree 100H to mass storage, such as the cluster-based storage 218.

Figure 10:
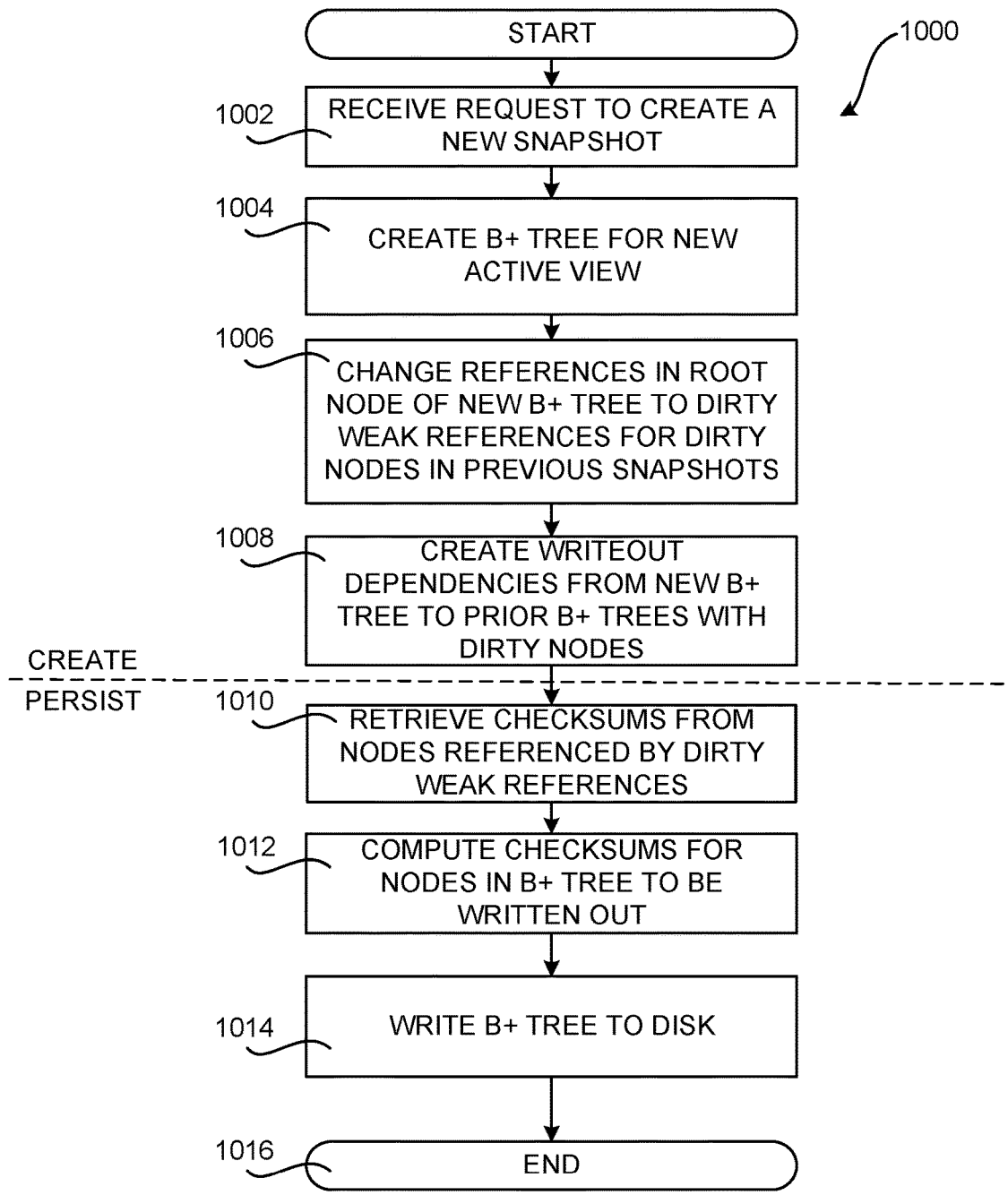
FIG. 10 is a flow diagram showing a routine that illustrates aspects of the mechanism shown in FIG. 9 for creating and persisting B+ tree representing a new active view when nodes in a B+ tree referenced by weak references are dirty, according to embodiments.

FIG. 10 is a flow diagram showing a routine 1000 that illustrates aspects of the mechanism shown in FIG. 9 for creating and persisting B+ tree representing a new snapshot when nodes in a B+ tree referenced by weak references are dirty, according to embodiments. The routine 1000 begins at operation 1002, where the snapshot creator 214 receives a request to create a new snapshot. Responsive to receiving such a request, the routine 1000 proceeds from operation 1002 to operation 1004, where a new B+ tree 100 is created representing the new snapshot.

As discussed above, in order to create a new B+ tree 100, the snapshot creator 214 creates a copy of the root node 302 of the B+ tree 100 representing the prior snapshot. The snapshot creator 214 also changes any strong references 308 in the new root node 302 to weak references 310 to nodes in B+ trees 100 representing prior snapshots at operation 1006.

In order to account for the possibility that nodes in the B+ trees 100 representing prior snapshots are dirty, the snapshot creator 214 changes references in the new root node 302 of the new B+ tree 100 to dirty weak references 904 for any referenced node that is dirty at operation 1008. As discussed above, a dirty weak reference 904 indicates that an updated checksum 902 for a referenced node is to be obtained and utilized to compute new checksums in the referencing B+ tree prior 100 to persisting the B+ tree 100 to mass storage.

From operation 1008, the routine 1000 proceeds to operation 1010, where the dataset manager 202 utilizes the dirty weak references 904 to collect updated checksums 902 for the referenced nodes in B+ trees 100 representing prior snapshots. The routine 1000 then proceeds from operation 1010 to operation 1012, where the dataset manager 202 utilizes the updated checksums 902 to compute new checksums for nodes in the B+ tree 100 with the dirty weak references 904. Once the checksums have been updated, the routine 1000 proceeds from operation 1012 to operation 1014, where the dataset manager 202 persists the updated B+ tree 100 to mass storage, such as the cluster-based storage 218. The routine 1000 then proceeds from operation 1014 to operation 1016, where it ends.

Figure 11:
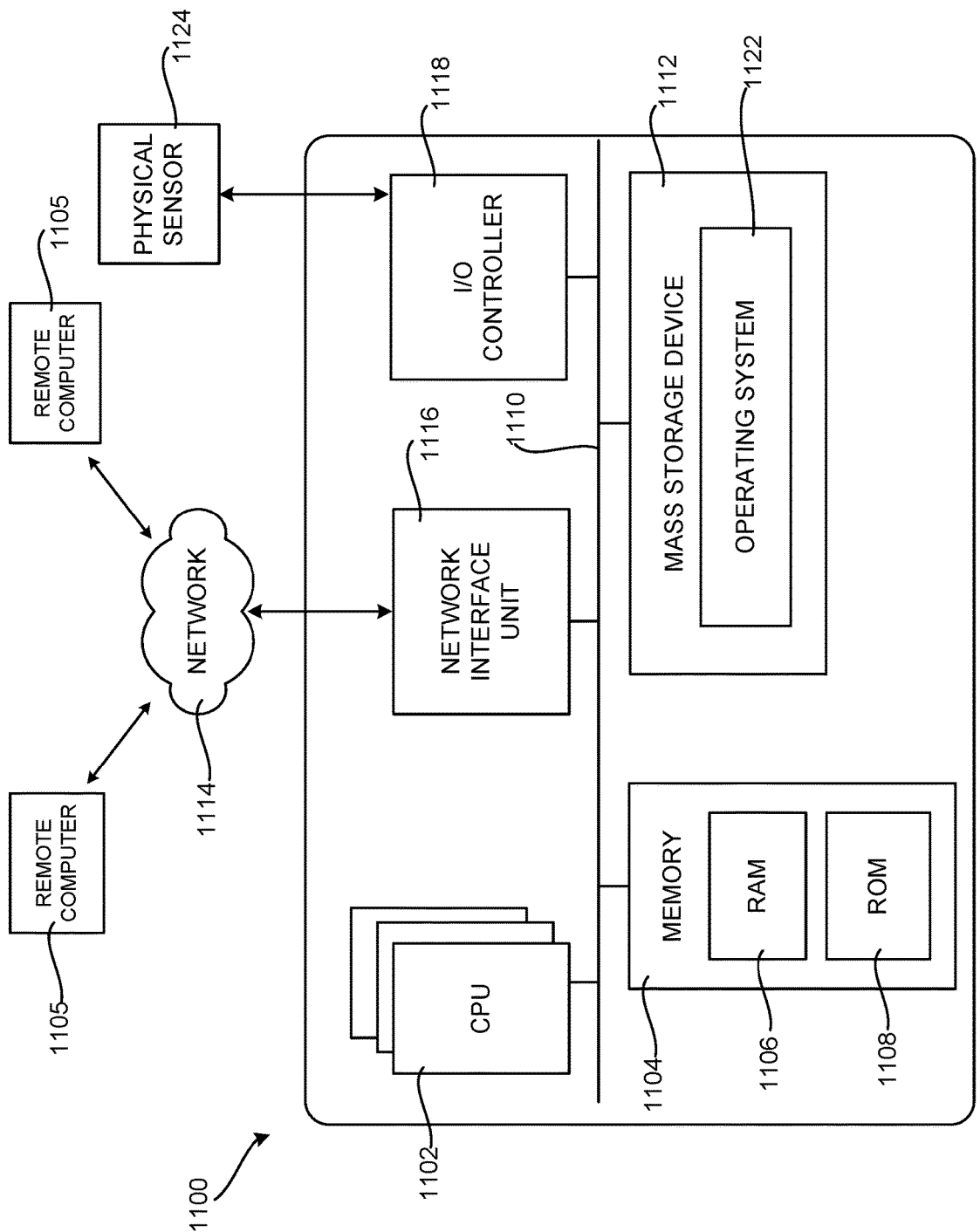
FIG. 11 is a computer architecture diagram showing an illustrative computer hardware and software architecture for a processing system that implements aspects of the technologies presented herein.

FIG. 11 is a computer architecture diagram showing an illustrative computer hardware and software architecture for a processing system 1100 that implements the various technologies presented herein, according to embodiments. The computer architecture illustrated in FIG. 11 is utilized to implement the processing system 200, aspects of which were described above with respect to FIG. 2 and the other FIGS., in an embodiment disclosed herein.

The processing system 1100 illustrated in FIG. 11 includes one or more central processing units ("CPUs") 1102, a system memory 1104, including a random-access memory 1106 ("RAM") and a read-only memory ("ROM") 1108, and a system bus 1110 that couples the system memory 1104 to other components in the processing system 1100. A firmware (not shown in FIG. 11) containing the basic routines that help to transfer information between elements within the processing system 1100, such as during startup, is stored in the ROM 1108, in embodiments.

The processing system 1100 further includes a mass storage device 1112 for storing an operating system ("OS") 1122, application programs, and other types of programs, such as those described above with respect to FIG. 2 and the other FIGS. The mass storage device 1112 is also configured to store other types of programs and data, in other embodiments.

The mass storage device 1112 is connected to the CPUs 1102 through a mass storage controller (not shown in FIG. 11) connected to the bus 1110. The mass storage device 1112 and its associated computer readable media provide non-volatile storage for the processing system 1100. Although the description of computer readable media contained herein refers to a mass storage device, such as a hard disk, Compact Disk Read-Only Memory ("CD-ROM") drive, Digital Versatile Disc-Read Only Memory ("DVD-ROM") drive, or Universal Serial Bus ("USB") storage key, computer readable media is any available computer-readable storage media or communication media that is accessible by the processing system 1100.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, communication media includes wired media such as a wired network or direct-wired connection, and wireless media such as acoustic, radio frequency, infrared and other wireless media. Combinations of the any of the above are also included within the scope of computer readable media.

By way of example, computer-readable storage media includes volatile and non-volatile, removable and non-removable media implemented in any method or technology for storage of information such as computer readable instructions, data structures, program modules, or other data. For example, computer-readable storage media includes RAM, ROM, erasable programmable ROM ("EPROM"), electrically EPROM ("EEPROM"), flash memory or other solid-state memory technology, CD-ROM, DVD-ROM, HD-DVD, BLU-RAY®, or other optical storage, magnetic cassettes, magnetic tape, magnetic disk storage or other magnetic storage devices, or any other medium that stores the desired information and which is accessible to the processing system 1100. For purposes of the claims, the phrase "computer-readable storage medium," and variations thereof, does not include waves or signals per se or communication media.

According to various configurations, the processing system 1100 operates in a networked environment using logical connections to remote computers 1105 through a network such as the network 1114. The processing system 1100 connects to the network 1114 through a network interface unit 1116 connected to the bus 1110. The network interface unit 1116 is utilized to connect to other types of networks and remote computer systems, in some embodiments.

The processing system 1100 also includes an input/output controller 1118 for receiving and processing input from a number of other devices, including a keyboard, mouse, touch input, an electronic stylus (none of which are shown in FIG. 11), or a physical sensor 1124, such as a video camera. Similarly, the input/output controller 1118 provides output to a display screen or other type of output device (also not shown in FIG. 11), in embodiments.

The software components described herein, when loaded into the processing system 1100 and executed, transform the processing system 1100 from a general-purpose computing device into a special-purpose processing system customized to facilitate the functionality presented herein. More specifically, the processing system 1100 operates as a finite-state machine in response to executable instructions contained within the software modules disclosed herein, in embodiments. These computer-executable instructions transform the processing system 1100 by specifying how the processing system 1100 transitions between states, thereby transforming the transistors or other discrete hardware elements constituting the processing system 1100.

Encoding the software modules presented herein also transforms the physical structure of the computer readable media presented herein. The specific transformation of physical structure depends on various factors, in different implementations of this description. Examples of such factors include, the technology used to implement the computer readable media, whether the computer readable media is characterized as primary or secondary storage, and the like.

For example, if the computer readable media is implemented as semiconductor-based memory, the software disclosed herein is encoded on the computer readable media by transforming the physical state of the semiconductor memory. For instance, the software transforms the state of transistors, capacitors, or other discrete circuit elements constituting the semiconductor memory. The software transforms the physical state of such components in order to store data thereupon.

As another example, the computer readable media disclosed herein is implemented using magnetic or optical technology, in embodiments. In such implementations, the program components presented herein transform the physical state of magnetic or optical media, when the software is encoded therein. These transformations include altering the magnetic characteristics of particular locations within given magnetic media. These transformations also include altering the physical features or characteristics of particular locations within given optical media, to change the optical characteristics of those locations. Other transformations of physical media are possible without departing from the scope and spirit of the present description, with the foregoing examples provided only to facilitate this discussion.

The architecture shown in FIG. 11 for the processing system 1100, or a similar architecture, is suitable for implementing other types of computing devices, including handheld computers, video game devices, embedded computer systems, mobile devices such as smartphones, tablets, alternate reality ("AR"), mixed reality ("MR"), and virtual reality ("VR") devices, and other types of computing devices known to those skilled in the art. It is also contemplated that the processing system 1100 might not include all of the components shown in FIG. 11, include other components that are not explicitly shown in FIG. 11, or an utilize an architecture completely different than that shown in FIG. 11, according to embodiments.

Figure 12:
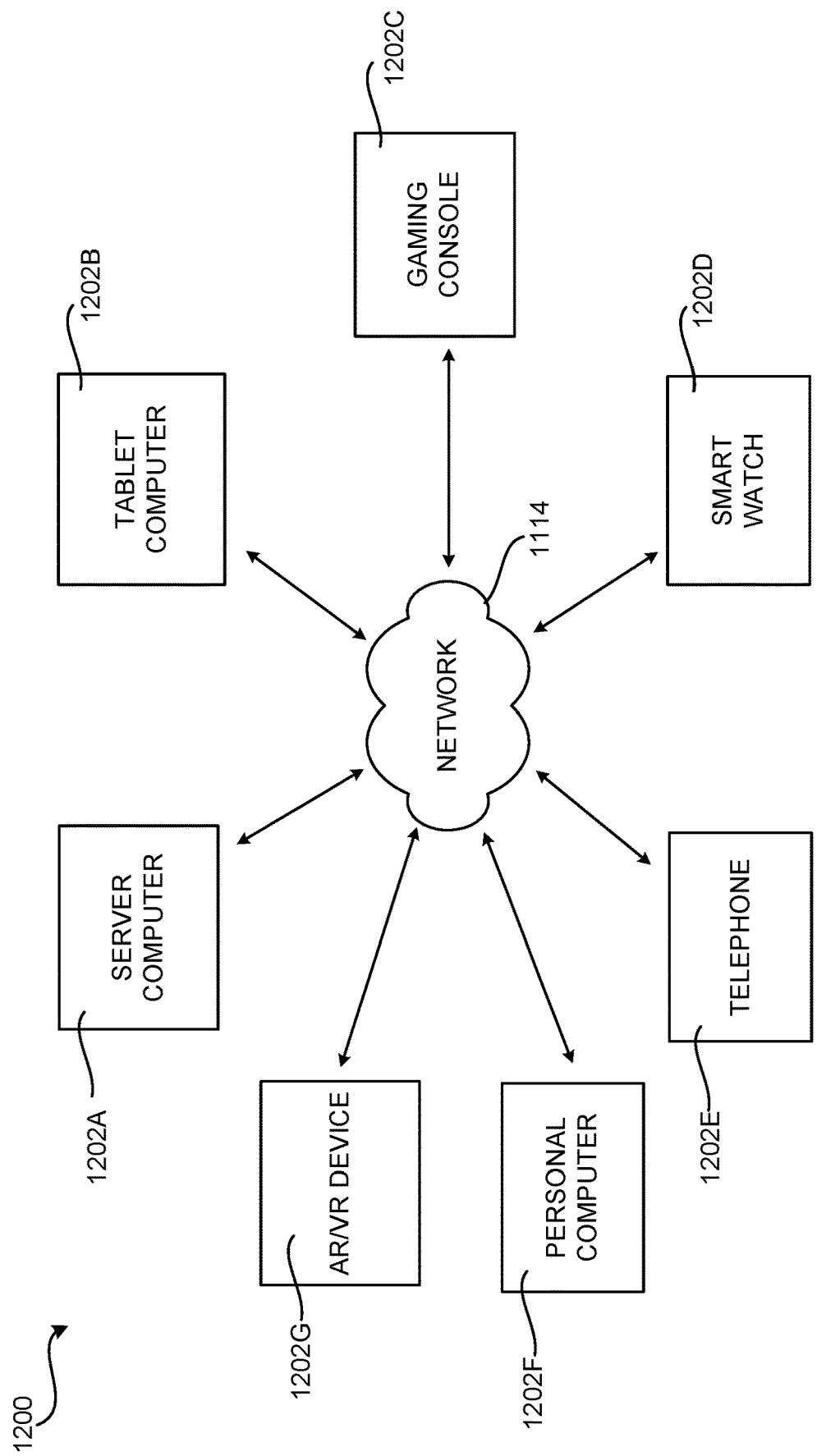
FIG. 12 is a network diagram illustrating an example distributed computing environment in which aspects of the disclosed technologies are implemented.

FIG. 12 is a network diagram showing an illustrative distributed network computing environment 1200 in which aspects of the disclosed technologies are implemented, according to various embodiments presented herein. As shown in FIG. 12, one or more server computers 1202A are interconnected via a network 1114 (which might be any of, or a combination of, a fixed-wire or WLAN, wide-area network ("WAN"), intranet, extranet, peer-to-peer network, VPN, the internet, BLUETOOTH® communication network, proprietary low voltage communication network, or other communication network) with a number of client computing devices 1202B-1202G, such as a tablet computer 1202B, a gaming console 1202C, a smart watch 1202D, a telephone 1202E, such as a smartphone, a personal computer 1202F, and an AR/VR device 1202G.

In a network environment in which the network 1114 is the internet, for example, the server computer 1202A is a dedicated server computer operable to process and communicate data to and from the client computing devices 1202B-1202G via any of a number of known protocols, such as, hypertext transfer protocol ("HTTP"), file transfer protocol ("FTP"), or simple object access protocol ("SOAP").

Additionally, the network computing environment 1200 utilizes various data security protocols such as secured socket layer ("SSL") or pretty good privacy ("PGP"), in embodiments. Each of the client computing devices 1202B-1202G is equipped with an OS, such as the OS 1122, operable to support one or more computing applications or terminal sessions such as a web browser (not shown in FIG. 12), graphical UI (not shown in FIG. 12), or a mobile desktop environment (not shown in FIG. 12) to gain access to the server computer 1202A, in embodiments.

The server computer 1202A is communicatively coupled to other computing environments (not shown in FIG. 12) and receives data regarding a participating user's interactions, in embodiments. In an illustrative operation, a user (not shown in FIG. 12) interacts with a computing application running on a client computing device 1202B-1202G to obtain desired data from the server computer 1202A and/or perform other computing applications.

The data and/or computing applications are stored on the server 1202A, or servers 1202A, and communicated to cooperating users through the client computing devices 1202B-1202G over the network 1114, in embodiments. A participating user (not shown in FIG. 12) requests access to specific data and applications housed in whole or in part on the server computer 1202A. These data are communicated between the client computing devices 1202B-1202G and the server computer 1202A for processing and storage.

The server computer 1202A hosts computing applications, processes and applets for the generation, authentication, encryption, and communication of data and applications such as those described above with regard to FIGS. 2-10, and cooperates with other server computing environments (not shown in FIG. 12), third party service providers (not shown in FIG. 12), and network attached storage ("NAS") and storage area networks ("SAN") (also not shown in FIG. 12) to realize application/data transactions, in embodiments.

The computing architecture shown in FIG. 11 and the distributed network computing environment shown in FIG. 12 have been simplified for ease of discussion. The computing architecture and the distributed computing network include and utilize many more computing components, devices, software programs, networking devices, and other components not specifically described herein, in various embodiments. Those skilled in the art will also appreciate that the subject matter described herein might be practiced with other computer system configurations other than those shown in FIGS. 11 and 12, including hand-held devices, multiprocessor systems, microprocessor-based or programmable consumer electronics, computing or processing systems embedded in devices (such as wearable computing devices, automobiles, and home automation), minicomputers, mainframe computers, and the like.

The operations of the routines and methods disclosed herein are not presented in any particular order and that performance of some or all of the operations in an alternative order, or orders, is possible and is contemplated. The operations have been presented in the demonstrated order for ease of description and illustration. Operations might be added, omitted, and/or performed simultaneously, without departing from the scope of the appended claims. The illustrated routines and methods might end at any time and need not be performed in their entireties.

Some or all operations of the methods, and/or substantially equivalent operations, are performed by execution of computer-readable instructions included on a computer-readable storage media, as defined herein, in embodiments. The term "computer-readable instructions," and variants thereof, as used herein, is used expansively herein to include routines, applications, application modules, program modules, programs, program components, data structures, algorithms, and the like. Computer-readable instructions are implemented on various system configurations, including single-processor or multiprocessor systems, minicomputers, mainframe computers, personal computers, hand-held computing devices, microprocessor-based, programmable consumer electronics, combinations thereof, and the like.

The logical operations described herein are implemented (1) as a sequence of computer implemented acts or program modules running on a computing system and/or (2) as interconnected machine logic circuits or circuit modules within the computing system, according to embodiments. The implementation is a matter of choice dependent on the performance and other requirements of the computing system. Accordingly, the logical operations described herein are referred to variously as states, operations, structural devices, acts, or modules. These operations, structural devices, acts, and modules are implemented in software, in firmware, in special-purpose digital logic, and any combination thereof, according to embodiments.

For example, the operations illustrated in the sequence and flow diagrams and described herein are implemented in embodiments, at least in part, by modules implementing the features disclosed herein such as a dynamically linked library ("DLL"), a statically linked library, functionality produced by an API, a network service, a compiled program, an interpreted program, a script or any other executable set of instructions. Data is stored in a data structure in one or more memory components. Data is retrieved from the data structure by addressing links or references to the data structure.

The methods and routines described herein might be also implemented in many other ways. For example, the routines and methods are implemented, at least in part, by a processor of another remote computer or a local circuit, in embodiments. In addition, one or more of the operations of the routines or methods are alternatively or additionally implemented, at least in part, by a chipset working alone or in conjunction with other software modules, in embodiments.

The disclosure presented herein also encompasses the subject matter set forth in the following clauses:

Clause 1. A computer-implemented method, comprising: storing a first hierarchical data structure defining an active view of a filesystem, the first hierarchical data structure comprising a first root node storing a strong reference to a first internal node in the first hierarchical data structure; receiving a request to create a snapshot of the filesystem defined by the first hierarchical data structure; creating a second hierarchical data structure defining a new active view of the filesystem, the second hierarchical data structure comprising a second root node created by copying the first root node; and changing the strong reference to the first internal node in the first hierarchical data structure in the second root node to a weak reference to the first internal node in the first hierarchical data structure.

Clause 2. The computer-implemented method of clause 1, further comprising performing a search operation with respect to the active view of the filesystem by following the weak reference stored by the second root node of the second hierarchical data structure to the first internal node in the first hierarchical data structure.

Clause 3. The computer-implemented method of any of clauses 1 or 2, further comprising: receiving a request to modify the second hierarchical data structure defining the new active view of the filesystem; traversing layers of the second hierarchical data structure, at each of the layers of the second hierarchical data structure, performing a copy-on-write operation to create a copy of a node from the first hierarchical data structure in the second hierarchical data structure, modifying weak references and strong references in nodes of the second hierarchical data structure to reference the first hierarchical data structure or the second hierarchical data structure, and modifying a record in a leaf node of the second hierarchical data structure according to the request.

Clause 4. The computer-implemented method of any of clauses 1-3, further comprising: responsive to receiving the request to create the snapshot of the filesystem defined by the first hierarchical data structure, identifying an internal node in the first hierarchical data structure that is dirty, and changing a strong reference in the second root node to the first internal node of the first hierarchical data structure that is dirty to a dirty weak reference.

Clause 5. The computer-implemented method of any of clauses 1-4, further comprising: receiving a request to persist the snapshot of the filesystem defined by the second hierarchical data structure; and responsive to the request to persist the snapshot of the filesystem defined by the second hierarchical data structure, utilizing the dirty weak reference to obtain checksums for nodes in the first hierarchical data structure, using the checksums to compute and store new checksums for nodes in the second hierarchical data structure, and persisting the second hierarchical data structure to mass storage.

Clause 6. The computer-implemented method of any of clauses 1-5, further comprising: receiving a request to delete the first hierarchical data structure; and responsive to the request to delete the first hierarchical data structure, identifying leaf nodes in the first hierarchical data structure having an associated strong reference from another node in the first hierarchical data structure and a corresponding leaf node in the second hierarchical data structure having an associated weak reference from another node in the second hierarchical data structure, storing data referencing the identified leaf nodes, and utilizing the stored data to determine when the identified leaf nodes can be deleted.

Clause 7. The computer-implemented method of any of clauses 1-6, wherein the filesystem comprises data defining a mapping between virtual cluster numbers (VCNs) and logical cluster numbers (LCNs) for a file.

Clause 8. A computer-readable storage medium having computer-executable instructions stored thereupon which, when executed by a processing system, cause the processing system to: receive a request to create a snapshot of filesystem represented by a first B+ tree, the first B+ tree comprising a first root node storing a strong reference to a first internal node in the first B+ tree; and responsive to receiving the request to create the snapshot of the filesystem represented by the first B+ tree, create a second B+ tree representing an active view of the filesystem, the second B+ tree comprising a second root node produced by creating a copy of the first root node, and change the strong reference in the second root node to a weak reference to the first internal node in the first B+ tree.

Clause 9. The computer-readable storage medium of clause 8, having further computer-executable instructions stored thereupon to: perform a search operation with respect to the active view of the filesystem by following the weak reference stored by the second root node of the second B+ tree to the first internal node in the first B+ tree.

Clause 10. The computer-readable storage medium of any of clauses 7 or 8, having further computer-executable instructions stored thereupon to: receive a request to modify the second B+ tree defining the active view of the filesystem; and responsive to the request to modify the second B+ tree, traverse layers of the second B+ tree, at each of the layers of the second B+ tree, perform a copy-on-write operation to create a copy of a node from the first B+ tree in the second B+ tree, modify weak references and strong references in nodes of the second B+ tree to reference the first B+ tree or the second B+ tree, and modify a record in a leaf node of the second B+ tree according to the request.

Clause 11. The computer-readable storage medium of any of clauses 8-10, having further computer-executable instructions stored thereupon to: identify a first internal node in the first B+ tree that is dirty; and change a strong reference in the second root node to the first internal node of the first B+ tree that is dirty to a dirty weak reference.

Clause 12. The computer-readable storage medium of any of clauses 8-11, having further computer-executable instructions stored thereupon to: receive a request to persist the active view of the filesystem defined by the second B+ tree; and responsive to the request to persist the active view of the filesystem defined by the second B+ tree, utilize the dirty weak reference to obtain checksums for nodes in the first B+ tree, use the checksums to compute and store new checksums for nodes in the second B+ tree, and persist the second B+ tree to mass storage.

Clause 13. The computer-readable storage medium of any of clauses 8-12, having further computer-executable instructions stored thereupon to: receive a request to delete the snapshot of the filesystem represented by the first B+ tree; and responsive to the request to delete the snapshot of the filesystem represented by the first B+ tree, identify leaf nodes in the first B+ tree having an associated strong reference from another node in the first B+ tree and a corresponding leaf node in the second B+ tree having an associated weak reference from another node in the second B+ tree, store data referencing the identified leaf nodes, and utilize the stored data to determine when the identified leaf nodes can be deleted.

Clause 14. The computer-readable storage medium of any of clauses 8-13, wherein the filesystem comprises data defining a mapping between virtual cluster numbers (VCNs) and logical cluster numbers (LCNs) for a file.

Clause 15. A processing system, comprising: a processor; and a computer-readable storage medium having computer-executable instructions stored thereupon which, when executed, cause the processing system to: receive a request to create a snapshot of filesystem represented by a first B+ tree, the first B+ tree comprising a first root node storing a strong reference to a first internal node in the first B+ tree; and responsive to receiving the request to create the snapshot of the filesystem represented by the first B+ tree, create a second B+ tree representing an active view of the filesystem, the second B+ tree comprising a second root node produced by creating a copy of the first root node, and change the strong reference in the second root node to a weak reference to the first internal node in the first B+ tree.

Clause 16. The processing system of clause 15, wherein the computer-readable storage medium has further computer-executable instructions stored thereupon to: perform a search operation with respect to the active view of the filesystem by following the weak reference stored by the second root node of the second B+ tree to the first internal node in the first B+ tree.

Clause 17. The processing system of any of clauses 15 or 16, wherein the computer-readable storage medium has further computer-executable instructions stored thereupon to: receive a request to modify the second B+ tree defining the active view of the filesystem; and responsive to the request to modify the second B+ tree, traverse layers of the second B+ tree, at each of the layers of the second B+ tree, perform a copy-on-write operation to create a copy of a node from the first B+ tree in the second B+ tree, modify weak references and strong references in nodes of the second B+ tree to reference the first B+ tree or the second B+ tree, and modify a record in a leaf node of the second B+ tree according to the request.

Clause 18. The processing system of any of clauses 15-17, wherein the computer-readable storage medium has further computer-executable instructions stored thereupon to: receive a request to delete the snapshot of the filesystem represented by the first B+ tree; and responsive to the request to delete the snapshot of the filesystem represented by the first B+ tree, identify leaf nodes in the first B+ tree having an associated strong reference from another node in the first B+ tree and a corresponding leaf node in the second B+ tree having an associated weak reference from another node in the second B+ tree, store data referencing the identified leaf nodes, and utilize the stored data to determine when the identified leaf nodes can be deleted.

Clause 19. The processing system of any of clauses 15-18, wherein the computer-readable storage medium has further computer-executable instructions stored thereupon to: identify a first internal node in the first B+ tree that is dirty; change the strong reference in the second root node to the first internal node of the first B+ tree that is dirty to a dirty weak reference; receive a request to persist the active view of the filesystem defined by the second B+ tree; and responsive to the request to persist the active view of the filesystem defined by the second B+ tree, utilize the dirty weak reference to obtain checksums for nodes in the first B+ tree, use the checksums to compute and store new checksums for nodes in the second B+ tree, and persist the second B+ tree to mass storage.

Clause 20. The processing system of any of clauses 15-19, wherein the filesystem comprises data defining a mapping between virtual cluster numbers (VCNs) and logical cluster numbers (LCNs) for a file.

Technologies for performing snapshotting operations using hierarchical data structures with weak references have been disclosed herein. Although the subject matter presented herein has been described in language specific to computer structural features, methodological and transformative acts, specific computing machinery, and computer readable media, it is to be understood that the subject matter set forth in the appended claims is not limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes might be made to the subject matter described herein without following the example configurations and applications illustrated and described, and without departing from the scope of the present disclosure, which is set forth in the following claims.

What is claimed is:

1. A computer-implemented method, comprising:
storing a first hierarchical data structure defining an active view of a filesystem, the first hierarchical data structure comprising a first root node storing a strong reference to a first internal node in the first hierarchical data structure;
receiving a request to create a snapshot of the filesystem defined by the first hierarchical data structure;
creating a second hierarchical data structure defining a new active view of the filesystem, the second hierarchical data structure comprising a second root node created by copying the first root node; and
changing the strong reference to the first internal node in the first hierarchical data structure in the second root node to a weak reference to the first internal node in the first hierarchical data structure.

2. The computer-implemented method of claim 1, further comprising performing a search operation with respect to the active view of the filesystem by following the weak reference stored by the second root node of the second hierarchical data structure to the first internal node in the first hierarchical data structure.

3. The computer-implemented method of claim 1, further comprising:
receiving a request to modify the second hierarchical data structure defining the new active view of the filesystem;
traversing layers of the second hierarchical data structure, at each of the layers of the second hierarchical data structure, performing a copy-on-write operation to create a copy of a node from the first hierarchical data structure in the second hierarchical data structure,
modifying weak references and strong references in nodes of the second hierarchical data structure to reference the first hierarchical data structure or the second hierarchical data structure, and
modifying a record in a leaf node of the second hierarchical data structure according to the request.

4. The computer-implemented method of claim 1, further comprising:

responsive to receiving the request to create the snapshot of the filesystem defined by the first hierarchical data structure,
    identifying an internal node in the first hierarchical data structure that is dirty, and
    changing a strong reference in the second root node to the first internal node of the first hierarchical data structure that is dirty to a dirty weak reference.

5. The computer-implemented method of claim 4, further comprising:
    receiving a request to persist the snapshot of the filesystem defined by the second hierarchical data structure; and
    responsive to the request to persist the snapshot of the filesystem defined by the second hierarchical data structure,
        utilizing the dirty weak reference to obtain checksums for nodes in the first hierarchical data structure,
        using the checksums to compute and store new checksums for nodes in the second hierarchical data structure, and
        persisting the second hierarchical data structure to mass storage.

6. The computer-implemented method of claim 1, further comprising: receiving a request to delete the first hierarchical data structure; and responsive to the request to delete the first hierarchical data structure,
    identifying leaf nodes in the first hierarchical data structure having an associated strong reference from another node in the first hierarchical data structure and a corresponding leaf node in the second hierarchical data structure having an associated weak reference from another node in the second hierarchical data structure,
    storing data referencing the identified leaf nodes, and
    utilizing the stored data to determine when the identified leaf nodes can be deleted.

7. The computer-implemented method of claim 1, wherein the filesystem comprises data defining a mapping between virtual cluster numbers (VCNs) and logical cluster numbers (LCNs) for a file.

8. A computer-readable storage medium having computer-executable instructions stored thereupon which, when executed by a processing system, cause the processing system to:
    receive a request to create a snapshot of filesystem represented by a first B+ tree, the first B+ tree comprising a first root node storing a strong reference to a first internal node in the first B+ tree; and
    responsive to receiving the request to create the snapshot of the filesystem represented by the first B+ tree,
        create a second B+ tree representing an active view of the filesystem, the second B+ tree comprising a second root node produced by creating a copy of the first root node, and
        change the strong reference in the second root node to a weak reference to the first internal node in the first B+ tree.

9. The computer-readable storage medium of claim 8, having further computer-executable instructions stored thereupon to:
    perform a search operation with respect to the active view of the filesystem by following the weak reference stored by the second root node of the second B+ tree to the first internal node in the first B+ tree.

10. The computer-readable storage medium of claim 8, having further computer-executable instructions stored thereupon to:
    receive a request to modify the second B+ tree defining the active view of the filesystem; and
    responsive to the request to modify the second B+ tree, traverse layers of the second B+ tree,
        at each of the layers of the second B+ tree, perform a copy-on-write operation to create a copy of a node from the first B+ tree in the second B+ tree,
        modify weak references and strong references in nodes of the second B+ tree to reference the first B+ tree or the second B+ tree, and
        modify a record in a leaf node of the second B+ tree according to the request.

11. The computer-readable storage medium of claim 8, having further computer-executable instructions stored thereupon to:
    identify a first internal node in the first B+ tree that is dirty; and
    change a strong reference in the second root node to the first internal node of the first B+ tree that is dirty to a dirty weak reference.

12. The computer-readable storage medium of claim 11, having further computer-executable instructions stored thereupon to:
    receive a request to persist the active view of the filesystem defined by the second B+ tree; and
    responsive to the request to persist the active view of the filesystem defined by the second B+ tree,
        utilize the dirty weak reference to obtain checksums for nodes in the first B+ tree,
        use the checksums to compute and store new checksums for nodes in the second B+ tree, and
        persist the second B+ tree to mass storage.

13. The computer-readable storage medium of claim 8, having further computer-executable instructions stored thereupon to:
    receive a request to delete the snapshot of the filesystem represented by the first B+ tree; and
    responsive to the request to delete the snapshot of the filesystem represented by the first B+ tree,
        identify leaf nodes in the first B+ tree having an associated strong reference from another node in the first B+ tree and a corresponding leaf node in the second B+ tree having an associated weak reference from another node in the second B+ tree,
        store data referencing the identified leaf nodes, and
        utilize the stored data to determine when the identified leaf nodes can be deleted.

14. The computer-readable storage medium of claim 8, wherein the filesystem comprises data defining a mapping between virtual cluster numbers (VCNs) and logical cluster numbers (LCNs) for a file.

15. A processing system, comprising:
    a processor; and
    a computer-readable storage medium having computer-executable instructions stored thereupon which, when executed, cause the processing system to:
        receive a request to create a snapshot of filesystem represented by a first B+ tree, the first B+ tree comprising a first root node storing a strong reference to a first internal node in the first B+ tree; and
        responsive to receiving the request to create the snapshot of the filesystem represented by the first B+ tree,
            create a second B+ tree representing an active view of the filesystem, the second B+ tree comprising a second root node produced by creating a copy of the first root node, and change the strong reference in the second root node to a weak reference to the first internal node in the first B+ tree.

16. The processing system of claim 15, wherein the computer-readable storage medium has further computer-executable instructions stored thereupon to:
perform a search operation with respect to the active view of the filesystem by following the weak reference stored by the second root node of the second B+ tree to the first internal node in the first B+ tree.

17. The processing system of claim 15, wherein the computer-readable storage medium has further computer-executable instructions stored thereupon to:
receive a request to modify the second B+ tree defining the active view of the filesystem; and
responsive to the request to modify the second B+ tree, traverse layers of the second B+ tree,
at each of the layers of the second B+ tree, perform a copy-on-write operation to create a copy of a node from the first B+ tree in the second B+ tree,
modify weak references and strong references in nodes of the second B+ tree to reference the first B+ tree or the second B+ tree, and
modify a record in a leaf node of the second B+ tree according to the request.

18. The processing system of claim 15, wherein the computer-readable storage medium has further computer-executable instructions stored thereupon to:
receive a request to delete the snapshot of the filesystem represented by the first B+ tree; and
responsive to the request to delete the snapshot of the filesystem represented by the first B+ tree,
identify leaf nodes in the first B+ tree having an associated strong reference from another node in the first B+ tree and a corresponding leaf node in the second B+ tree having an associated weak reference from another node in the second B+ tree,
store data referencing the identified leaf nodes, and
utilize the stored data to determine when the identified leaf nodes can be deleted.

19. The processing system of claim 15, wherein the computer-readable storage medium has further computer-executable instructions stored thereupon to:
identify a first internal node in the first B+ tree that is dirty;
change the strong reference in the second root node to the first internal node of the first B+ tree that is dirty to a dirty weak reference;
receive a request to persist the active view of the filesystem defined by the second B+ tree; and
responsive to the request to persist the active view of the filesystem defined by the second B+ tree,
utilize the dirty weak reference to obtain checksums for nodes in the first B+ tree,
use the checksums to compute and store new checksums for nodes in the second B+ tree, and
persist the second B+ tree to mass storage.

20. The processing system of claim 15, wherein the filesystem comprises data defining a mapping between virtual cluster numbers (VCNs) and logical cluster numbers (LCNs) for a file.

* * * * *